(12) United States Patent
Shih et al.

(10) Patent No.: US 12,373,958 B2
(45) Date of Patent: Jul. 29, 2025

(54) REAL TIME PERSPECTIVE CORRECTION ON FACES

(71) Applicant: Google LLC, Mountain View, CA (US)

(72) Inventors: Yichang Shih, Sunnyvale, CA (US); Chia-Kai Liang, Mountain View, CA (US); Wei-Sheng Lai, Mountain View, CA (US); Ming-Hsuan Yang, Sunnyvale, CA (US); Siargey Pisarchyk, Sunnyvale, CA (US); Ryhor Karpiak, San Jose, CA (US)

(73) Assignee: Google LLC, Mountain View, CA (US)

( * ) Notice: Subject to any disclaimer, the term of this patent is extended or adjusted under 35 U.S.C. 154(b) by 893 days.

(21) Appl. No.: 17/460,831

(22) Filed: Aug. 30, 2021

(65) Prior Publication Data

US 2022/0058808 A1    Feb. 24, 2022

Related U.S. Application Data

(63) Continuation of application No. 16/591,104, filed on Oct. 2, 2019, now Pat. No. 11,132,800.
(Continued)

(51) Int. Cl.
*G06T 7/174* (2017.01)
*G06N 3/045* (2023.01)
(Continued)

(52) U.S. Cl.
CPC .............. *G06T 7/174* (2017.01); *G06N 3/045* (2023.01); *G06T 17/20* (2013.01); *G06V 40/165* (2022.01)

(58) Field of Classification Search
USPC .................................................. 382/173, 276
See application file for complete search history.

(56) References Cited

U.S. PATENT DOCUMENTS 9,786,030 B1    10/2017   Binder
10,198,872 B2 *  2/2019   Lurie ...................... G06T 19/20
(Continued)

FOREIGN PATENT DOCUMENTS

WO    2019216879 A1    11/2019

OTHER PUBLICATIONS

Zhang et al., A Global Approach to Fast Video Stabilization, IEEE 1051-8215, IEEE Tranansaction on Circuit and Systems for Video Technology, vol. 27, No. 2, pp. 225-235. (Year: 2017).*
(Continued)

*Primary Examiner* — Ishrat I Sherali
(74) *Attorney, Agent, or Firm* — McDonnell Boehnen Hulbert & Berghoff LLP

(57) ABSTRACT

Apparatus and methods related to image processing are provided. A computing device can determine a first image area of an image, such as an image captured by a camera. The computing device can determine a warping mesh for the image with a first portion of the warping mesh associated with the first image area. The computing device can determine a cost function for the warping mesh by: determining first costs associated with the first portion of the warping mesh that include costs associated with face-related transformations of the first image area to correct geometric distortions. The computing device can determine an optimized mesh based on optimizing the cost function. The computing device can modify the first image area based on the optimized mesh.

20 Claims, 30 Drawing Sheets

Related U.S. Application Data

(60) Provisional application No. 62/880,903, filed on Jul. 31, 2019.

(51) Int. Cl.
  *G06T 5/80* (2024.01)
  *G06T 17/20* (2006.01)
  *G06V 40/16* (2022.01)

(56) References Cited

U.S. PATENT DOCUMENTS

| | | | |
|---|---|---|---|
| 11,132,800 B2* | 9/2021 | Shih | G06T 5/80 |
| 11,922,720 B2* | 3/2024 | Shih | G06T 19/20 |
| 2004/0001146 A1 | 1/2004 | Liu | |
| 2011/0090303 A1 | 4/2011 | Wu | |
| 2015/0091900 A1 | 4/2015 | Yang | |
| 2016/0253791 A1 | 9/2016 | Kurata | |
| 2017/0046833 A1* | 2/2017 | Lurie | G06T 17/20 |
| 2017/0069056 A1* | 3/2017 | Sachs | G06T 17/20 |
| 2020/0082154 A1* | 3/2020 | Hussain | G06F 40/20 |

OTHER PUBLICATIONS

Tzcovich, "faced: CPU Real time detection using Deep Learning", https://towardsdatascience.com/faced-cpu-real-time-detection-using-deep-learning-1488681c1602, Sep. 26, 2018, 18 pages*.

Shih et al., "Distortion-Free Wide-Angle Portraits on Camera Phones", ACM Trans. Graph., Jul. 2019, pp. 1-12, vol. 28, No. 4, Article 61*.

Tehrani et al., "Undistortging Foreground Objects in Wide Angle Images", 2013 IEEE International Symposium on Multimedia, Dec. 1, 2013, pp. 46-52*.

Wadhwa et al., "Synthetic Depth-of-Field with a Single-Camera Mobile Phone", ACM Trans. Graph, Aug. 2018, 18 pages, vol. 37 No. 4, Article 64*.

Bazarevsky et al., "Mobile Real-Time Video Segmentation" available via the Internet at https://ai_googleblog_com/2018/03/mobile-real-time-video-segmentation_html. (last visited Nov. 8, 2019)*.

Liang et al., International Patent App. No. PCT/US2018/031463, filed May 7, 2018, 61 pages*.

Ronneberger et al., "U-Net: Convolutional Networks for Biomedical Image Segmentation" Arvix.org, Cornell University Library, May 18, 2015, 8 pages*.

International Searching Authority, International Search Report and Written Opinion mailed on Mar. 7, 4, 2019, issued in connection with International Patent Application No. PCT/US2018/031463, filed on May 7, 2018, 13 pages*.

Devernay et al. "Straight lines have to be straight", Machine Vision and Applications., vol. 13, No. 1, Aug. 1, 2001 (Aug. 1, 2001), pp. 14-24, XP055547791, DE ISSN: 0932-8092, DOI: 10.1 007/PL00013269*.

Fried et al. "Perspective-aware manipulation of portrait photos", ACM Transactions on Graphics (TOG), vol. 35, No. 4, Jul. 11, 2016 (Jul. 11, 2016), pp. 1-10, XP055547789, us ISSN: 0730-0301, DOI: 10.1145/2897824-2925933*.

Leonid et al. "Image warping for face recognition: From local optimality towards global optimization", Pattern Recognition, vol. 45, No. 9, pp. 3131-3140, XP0289261 02, ISSN: 0031-3203, DOI: 10.1016/J_PATCOG.2011.10.017*.

* cited by examiner

110 Receive image I having width W(I) and height H(I). Determine N, which is a number of faces represented by image I whose sizes are larger than a threshold size. (FIG. 7)

120 Determine N face boxes $FB_k$ for the N faces, where k ranges between 1 and N. Extend each face box $FB_k$ as necessary to contain facial landmarks of the kth face. (FIGS. 2 and 8)

130 For each face box $FB_k$ compute segmentation mask $M_k$ from face box $FB_k$. Let M be the union of all segmentation masks $M_k$ (FIG. 3)

140 Create at least one warping mesh v having NR x NC vertices for image I, where both NR and NC are greater than 0 (FIG. 4)

150 Update warping mesh v with costs associated with performing one or more face-related transformations for the N faces in image I in locations of warping mesh v corresponding to mask M, where the transformation(s) correct(s) one or more geometric distortions of at least one of the N faces (FIG. 9)

160 Update warping mesh v with costs associated with performing one or more edge-related transformations for preserving straightness of edges of the image modified at least by the one or more face-related transformations and with costs for boundaries of warping mesh v (FIG. 10)

170 Determine optimized mesh v' based on a numerical optimization / minimization of cost terms of vertices of warping mesh v (FIGS. 5 and 11)

180 Determine inverse mesh z by resampling optimized mesh v' (FIG. 12)

190 Determine output image O by at least: For each pixel P(O) of image O, update P(O) based on a sample of image I taken at sampling coordinates determined based on inverse mesh Z (FIGS. 6 and 13)

1710 At timestep t, receive image $I_t$ having width $W(I_t)$ and height $H(I_t)$. Determine $N_t$ number of faces represented by image $I_t$ whose size larger than a threshold size. Determine face boxes $FB_k$ $1 \leq k \leq N_t$ for the $N_t$ faces. Extend each face box $FB_k$ as necessary.

↓

1720 Apply segmentation network to determine a global segmentation mask M for image $I_t$ (FIG. 18)

↓

1730 Create at least one warping mesh v having NR x NC vertices for image $I_t$, where both NR and NC are greater than 0 (FIG. 4)

↓

1740 Update warping mesh v with costs associated with performing one or more face-related transformations for the $N_t$ faces in image $I_t$ in locations of warping mesh v corresponding to mask M, where the transformation(s) correct(s) one or more geometric distortions of at least one of the $N_t$ faces (FIG. 21)

↓

1750 Update warping mesh v with costs associated with performing one or more edge-related transformations for preserving straightness of edges of the image modified at least by the one or more face-related transformations and with costs for boundaries of warping mesh v (FIG. 10)

↓

1760 Determine optimized mesh v' based on a numerical optimization / minimization of cost terms of vertices of warping mesh v. Cache optimized mesh v' for time step t (FIGS. 11)

↓

1770 Determine inverse mesh z by resampling optimized mesh v' (FIG. 12)

↓

1780 Determine output image O by at least: For each pixel P(O) of image O, update P(O) based on a sample of image $I_t$ taken at sampling coordinates determined based on inverse mesh Z (FIGS. 6 and 13)

↓

1790 Provide and store output image O, continue to timestep to t + 1.

FIG. 17

REAL TIME PERSPECTIVE CORRECTION ON FACES

CROSS-REFERENCE TO RELATED APPLICATIONS

This patent application claims priority to U.S. Non-Provisional patent application Ser. No. 16/591,104 filed on Oct. 2, 2019, which in turn claims priority to U.S. Provisional Patent Application No. 62/880,903 filed on Jul. 31, 2019, entitled "Real Time Perspective Correction on Faces", the contents of which are entirely incorporated herein by reference for all purposes.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized.

SUMMARY

In one aspect, a computer-implemented method is provided. Image data representing an image is received. A first image area corresponding to a first region of interest in the image is determined. A warping mesh for the image is determined. A first portion of the warping mesh associated with the first image area is determined. A cost function for the warping mesh is determined by: determining first costs associated with the first portion of the warping mesh, where the first costs include costs associated with one or more face-related transformations of at least the first image area to correct one or more geometric distortions of the first region of interest as represented in the image. An optimized mesh based on an optimization of the cost function for the warping mesh is determined. The first image area of the image based on the optimized mesh is modified.

In another aspect, a computing device is provided. The computing device includes: one or more processors; and one or more computer readable media having computer-readable instructions stored thereon that, when executed by the one or more processors, cause the computing device to carry out functions. The functions include: receiving image data representing an image; determining a first image area corresponding to a first region of interest in the image; determining a warping mesh for the image; determining a first portion of the warping mesh associated with the first image area; determining a cost function for the warping mesh by: determining first costs associated with the first portion of the warping mesh, where the first costs include costs associated with one or more face-related transformations of at least the first image area to correct one or more geometric distortions of the first region of interest as represented in the image; determining an optimized mesh based on an optimization of the cost function for the warping mesh; and modifying the first image area of the image based on the optimized mesh.

In another aspect, an article of manufacture is provided. The article of manufacture includes one or more computer readable media having computer-readable instructions stored thereon that, when executed by one or more processors of a computing device, cause the computing device to carry out functions. The functions include: receiving image data representing an image; determining a first image area corresponding to a first region of interest in the image; determining a warping mesh for the image; determining a first portion of the warping mesh associated with the first image area; determining a cost function for the warping mesh by: determining first costs associated with the first portion of the warping mesh, where the first costs include costs associated with one or more face-related transformations of at least the first image area to correct one or more geometric distortions of the first region of interest as represented in the image; determining an optimized mesh based on an optimization of the cost function for the warping mesh; and modifying the first image area of the image based on the optimized mesh.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 is a flowchart of a method, in accordance with an example embodiment.

FIG. 17 is a flowchart of a method, in accordance with an example embodiment.

DETAILED DESCRIPTION

Figure 2:
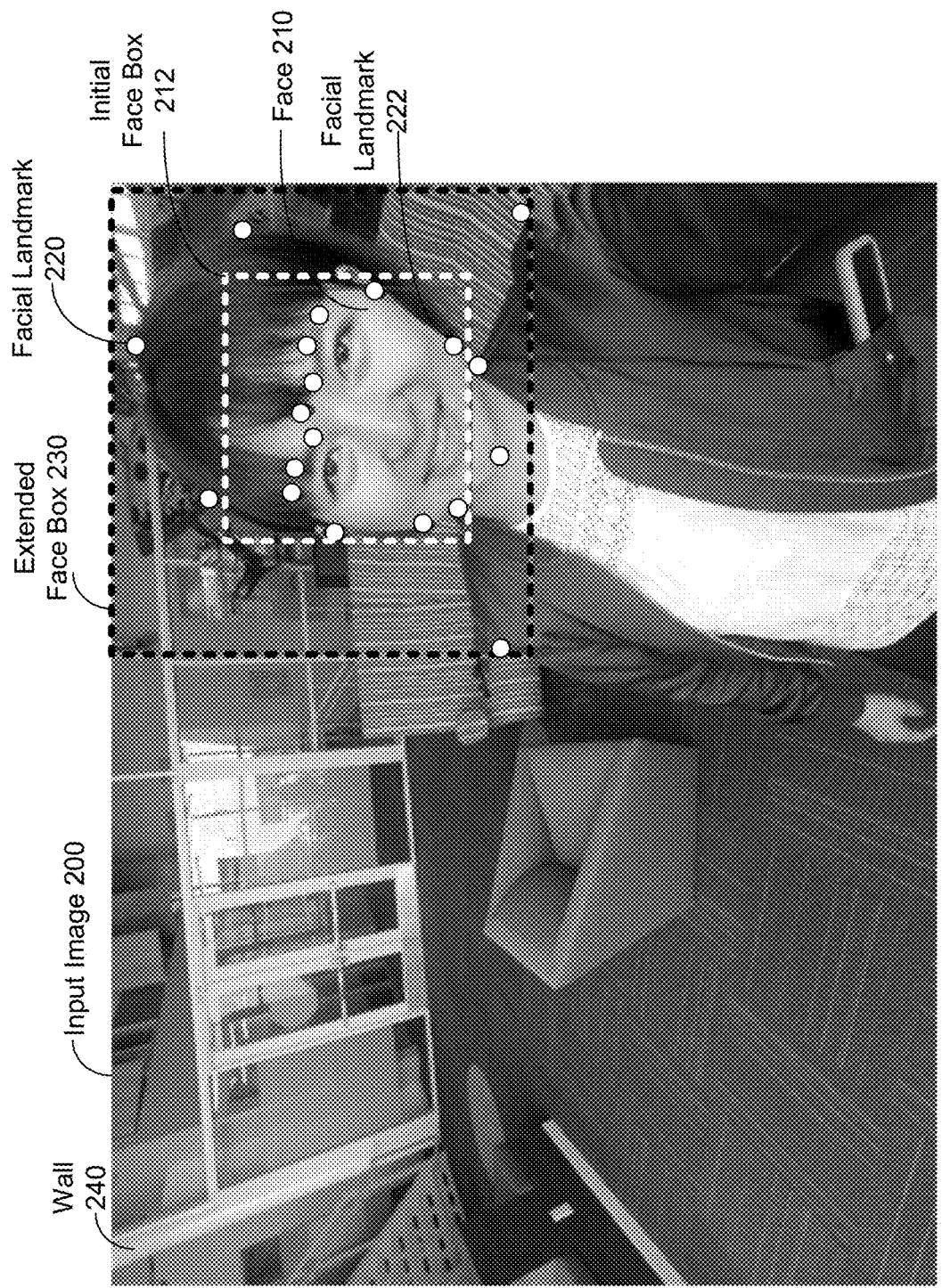
FIG. 2 shows an input image with a face box and an extended face box, in accordance with an example embodiment.

When objects are photographed, a three dimensional environment is reproduced as a two dimensional image. Accordingly, three dimensional points in space are projected onto a two dimensional coordinate system. Various distortions may occur as a result of such projections. For example, perspective distortion can occur when an angle of view of from which an image was captured differs from the angle of view at which the image is viewed, and can result in a distortion in the relative appearance of objects at varying distances from the imaging device. Perspective distortion artifacts can be particularly noticeable in the use of Wide Field of View (WFOV) imaging systems, which can include WFOV lenses and/or WFOV sensors. Accordingly, the advantages of WFOV imaging systems—which are often present on mobile computing devices or other devices; e.g., smartphones, flip phones, tablets—are often associated with drawbacks in image fidelity. Such an effect can often be particularly pronounced for objects in the periphery of an image.

As a result, when human faces and/or other objects are photographed, particularly in the peripheral regions of a resulting photograph or other image, the human faces and/or other objects may exhibit stretched and skewed features as a result of perspective distortion. This is a technical consequence of the imaging system and can be disadvantageous in terms of image fidelity and cause a reduction in image quality. In particular, distortions of human faces can be particularly noticeable and thus represent a meaningful degradation in image quality even where such distortions are relatively minor. That is, perspective distortion can cause disagreeable distortions of human faces, resulting in negative impacts on user experiences. Perspective distortion can cause disagreeable distortions of human faces, resulting in negative impacts on user experiences.

As such, there is a problem with images (e.g., photographs, imagery in video recordings) captured with perspective distortion artifacts of objects such as faces, including human faces. Herein are described techniques and related apparatus to correct these perspective distortion artifacts in photographs and/or other images. The herein-described techniques and related apparatus can help correct these artifacts using one or more projections. More particularly, facial regions of one or more input images; that is, regions of input image(s) that represent faces, can be locally corrected using a first projection and regions of input image(s) outside of facial regions can be corrected using a second projection. For example, the first projection can be a stereographic projection and the second projection can be a perspective projection. The first projection and/or the second projection can be embodied in a mesh. Also, one or more corrected images that reflect the corrections made to the one or more input images using the mesh, the first projection, and/or the second projection can be generated, displayed, transmitted, and/or otherwise produced—in some cases, a corrected image can reflect corrections made using the mesh, the first projection, and/or the second projection to most, if not all, pixels of a corresponding input image. As an example, these herein-described techniques can be embodied in a software application of a mobile computing device.

Other techniques have been used to correct images. In some cases, fish-eye lenses and/or related software are utilized to globally map an image in an attempt to correct perspective distortion artifacts. However, fish-eye lenses and/or related software are not able to produce straight lines, and render a resulting image with a curvy appearance. The herein-described techniques and related apparatus can correct perspective distortion artifacts while maintaining straight lines in images, thereby creating few, if any, additional artifacts in a perspective-distortion corrected image. Further, a software application can perform the herein-described techniques efficiently on a mobile computing device.

In particular, herein-described techniques rely on a concept of locally blending conformal projections on facial regions of an image, where a facial region is a region of an image that represents one or more faces. Conformal projections can include angle-preserving projections, such as stereographic projections which project a sphere onto a plane while preserving angles where curves meet. The rest of the image; that is, the portion of the image outside of the facial regions, can be rendered using a perspective projection that preserves straight lines. However, a conformal projection applied to an entire image distorts the shapes and curvatures of rigid objects in the entire image. To avoid these distortions of shapes and curvatures of objects, the herein-described techniques apply conformal projections locally to facial regions. Then, to address the shape/curvature distortions outside of facial regions, straightness-preserving perspective transformations are used on the rest of the image. The resulting image correction technique combines the conformal projections on facial regions of an image and the perspective projection on the rest of the image.

In some examples, the herein-described techniques may be applied to correct images in a successive image stream (e.g., a video stream). For example, the herein-described techniques can be utilized in a real-time face distortion rectification system that corrects temporal flickering and/or wobbling between successive images in a stream. Techniques that involve a neural network for real-time subject segmentation and a temporal coherence term to adjust for previous images in a stream are provided in the description herein.

In some examples, the herein-described techniques can be utilized with minimal or no user input. For example, the herein-described techniques can be utilized without requesting a user identify facial regions, lines, or other aspects of an image and without requesting user specification of terms utilized in calculations of the herein-described techniques. Rather, as discussed below, the herein-described techniques can be utilized without such user inputs on aspects of the image and on terms used in the herein-described calculations, and therefore can be utilized in automatic image correction applications. Also, the herein-described techniques can be utilized without user input to correct a series of images, such as a series of images in a video recording. Thus, the herein-described techniques can be beneficially utilized to correct facial regions in still images and/or in images of video recordings without requiring user input. Of course, variations of the herein-described techniques with some user input are possible as well.

Techniques and Apparatus for Correcting Perspective Distortion in Images

A mesh optimization problem can be solved on a warping mesh to combine conformal projections on facial regions of an image and perspective projections on the rest of the image. Then, an output image can be rendered by warping a related input image with perspective distortions using an optimized mesh that solves the mesh optimization problem.

In some examples, the following procedure, which is related to method 100 discussed below in the context of FIG. 1, can be used to generate a corrected output image O that corrects some or all of the perspective distortions in a corresponding input image I:

1. Triggering conditions of input image I can be checked. For example, such triggering conditions can relate to the representation of faces (e.g., human faces, animal faces) and/or other objects the sizes of representations of such faces and/or objects, and conformality costs related to the representations of faces and/or objects. Other triggering conditions are possible as well.
2. One or more facial masks corresponding to facial region(s) of image I can be determined. A union of the facial masks can be used as a combination of the portions of image I that correspond to facial region(s). In some examples where artifacts of objects other than faces are to be corrected, the facial masks and corresponding facial regions can be replaced and/or augmented with one or more masks for the objects other than faces and/or one or more corresponding object regions of image I for the objects other than faces.
3. Scale factors related to the facial region(s) can be estimated. For example, facial regions of image I can be associated with a first type of transformation or other processing technique, and non-facial regions of image I can be associated with a second type of transformation or other processing technique—then, a scale factor can represent a ratio of an area of a portion P of image I processed with the first type of transformation to an area of the portion P of image I processed with the second type of transformation (or vice versa). Other scale factors are possible as well.
4. A mesh optimization problem can be formulated as an optimization equation with energy terms in a warping mesh v. For example, the mesh optimization problem can be a minimization problem to minimize the energy terms represented in the warping mesh v. Other mesh optimization problems are possible as well.
5. Boundary conditions can be imposed on the warping mesh v. In some examples, boundary conditions are not imposed.
6. The mesh optimization problem on the warping mesh v can be numerically solved and that solution can be normalized to yield an optimal mesh v'.
7. The optimal mesh v' can be resampled to generate an inverse mesh z.
8. The output image O can be generated by sampling pixels of input image I based on coordinates generated using inverse mesh z. Output image O can correct input image I by reducing or eliminating the artifacts related to perspective distortions in input image I.

Other procedures are possible for use in generating a corrected output image O that corrects some or all of the perspective distortions in a corresponding input image I.

FIG. 1 is a flowchart of a method 100, in accordance with an example embodiment. Method 100, which is related to the procedure described above, can generate a corrected output image O that corrects perspective distortions in a corresponding input image I. Method 100 can be carried out by a computing device, such as computing device 2300 described below.

Method 100 can begin at block 110, where the computing device can receive an input image I having width W(I) and height H(I). Also, the computing device can determine N, which is a number of faces represented by image I whose sizes are larger than a threshold size. Detailed procedures related to block 110 are described below in the context of FIG. 7.

At block 120, the computing device can determine N face boxes $FB_k$ for the N faces in input image I, where k ranges from 1 to N. A face box for an image can indicate a region of the image that represents a face, such as a human face. In some examples, the face box can have a square or rectangular shape. In other examples, the face box can have a different shape than a square or rectangle; e.g., an oval or elliptical shape, a triangular shape, a hexagonal shape, etc.

The computing device can extend each face box $FB_k$, $1 \le k \le N$, of the N face boxes as necessary to contain facial landmarks of the $k^{th}$ face. A facial landmark of a face can indicate location on the face of a particular feature of the face; such features of a face can include, but are not limited to: a top of a head with the face, hair of the face, a forehead of the face, an eye of the face, a nose of the face, a nostril of the face, a lip of the face, a mouth of the face, a chin of the face, a tongue of a face, teeth of the face, a facial expression of the face, a dimple on the face, a beauty mark and/or other mark on the face, and a neck holding up the face. Detailed procedures related to block 120 are described below in the context of FIG. 8.

As an example related to block 120, FIG. 2 shows an example input image 200 that includes face 210 in front of wall 240, where face 210 is located near a right edge of image 200. FIG. 2 shows that face 210 is partially surrounded by initial face box 212. That is, in the example input image 200 shown in FIG. 2, N is equal to 1, and face box 212 can be considered to be $FB_1$ before extension. Then, facial landmarks can be detected in image 200—such facial landmarks are shown in FIG. 2 as white circles and include facial landmark 220 near a top of face 210 and facial landmark 222 at lower right of face 210. Face box 212 includes facial landmark 222 but does not include facial landmark 220. Thus, at block 120, the computing device can extend face box 212 to include all facial landmarks found for face 210—the resulting extended face box is shown in FIG. 2 as extended face box 230.

At block 130, the computing device can, for each face box $FB_k$, 1≤k≤N, of the N face boxes, compute a segmentation mask Mk in input image I. Then, the computing device can determine an image mask M as a union of all segmentation masks Mk.

Figure 3:
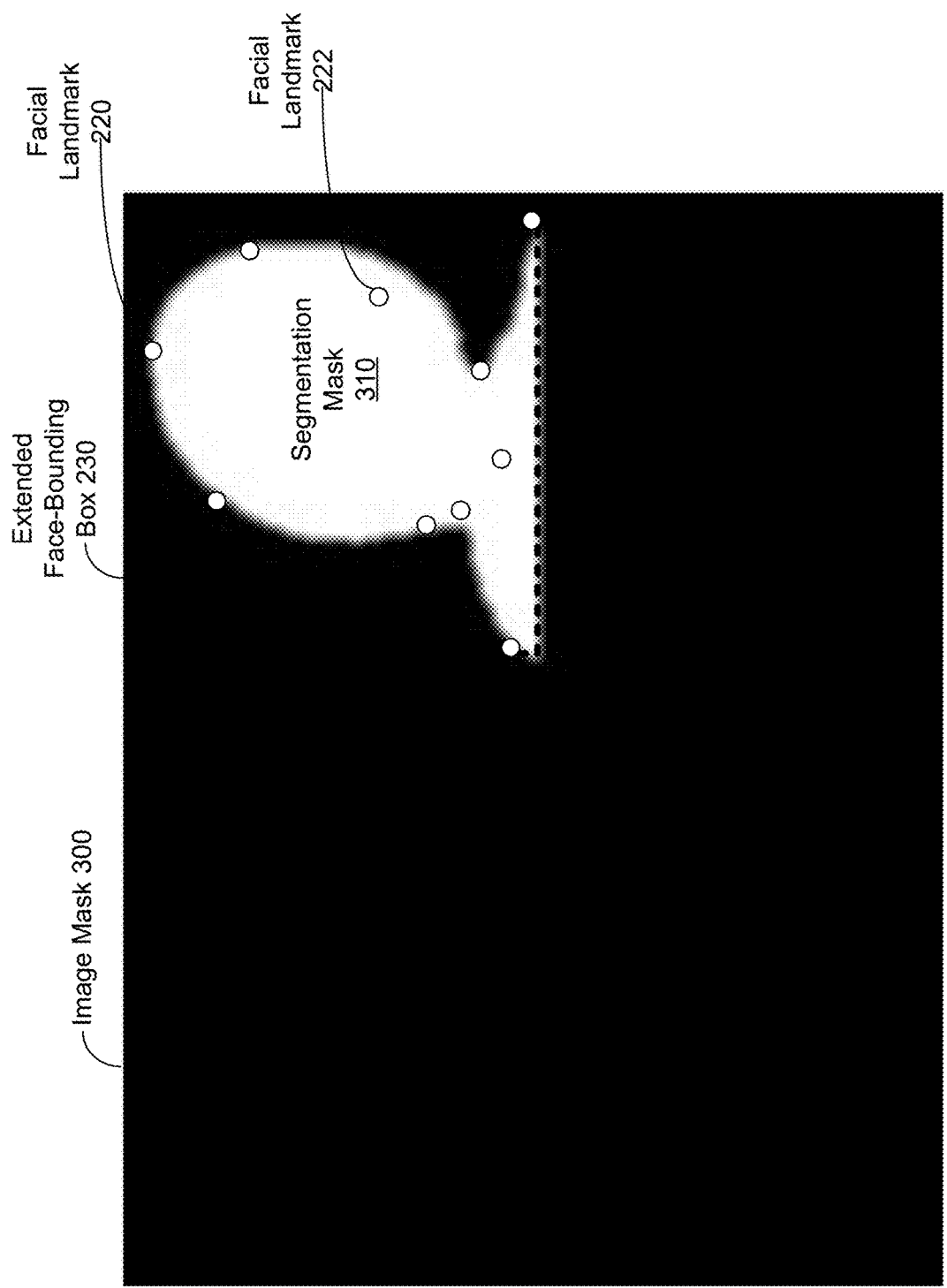
FIG. 3 shows an image mask for the input image of FIG. 2, in accordance with an example embodiment.

As an example related to block 130, FIG. 3 shows image mask 300, which represents segmentation mask $M_1$ for extended face box $FB_1$ that are respectively represented as segmentation mask 310 and extended face box 230. Segmentation mask 310 is a mask representing face 210, as illustrated by facial landmarks of face 210 including facial landmarks 220 and 222.

In some examples, at block 130 the computing device can determine if input image I includes lens distortion. If image I does include lens distortion, the lens distortion can be corrected by warping image mask M.

Figure 4:
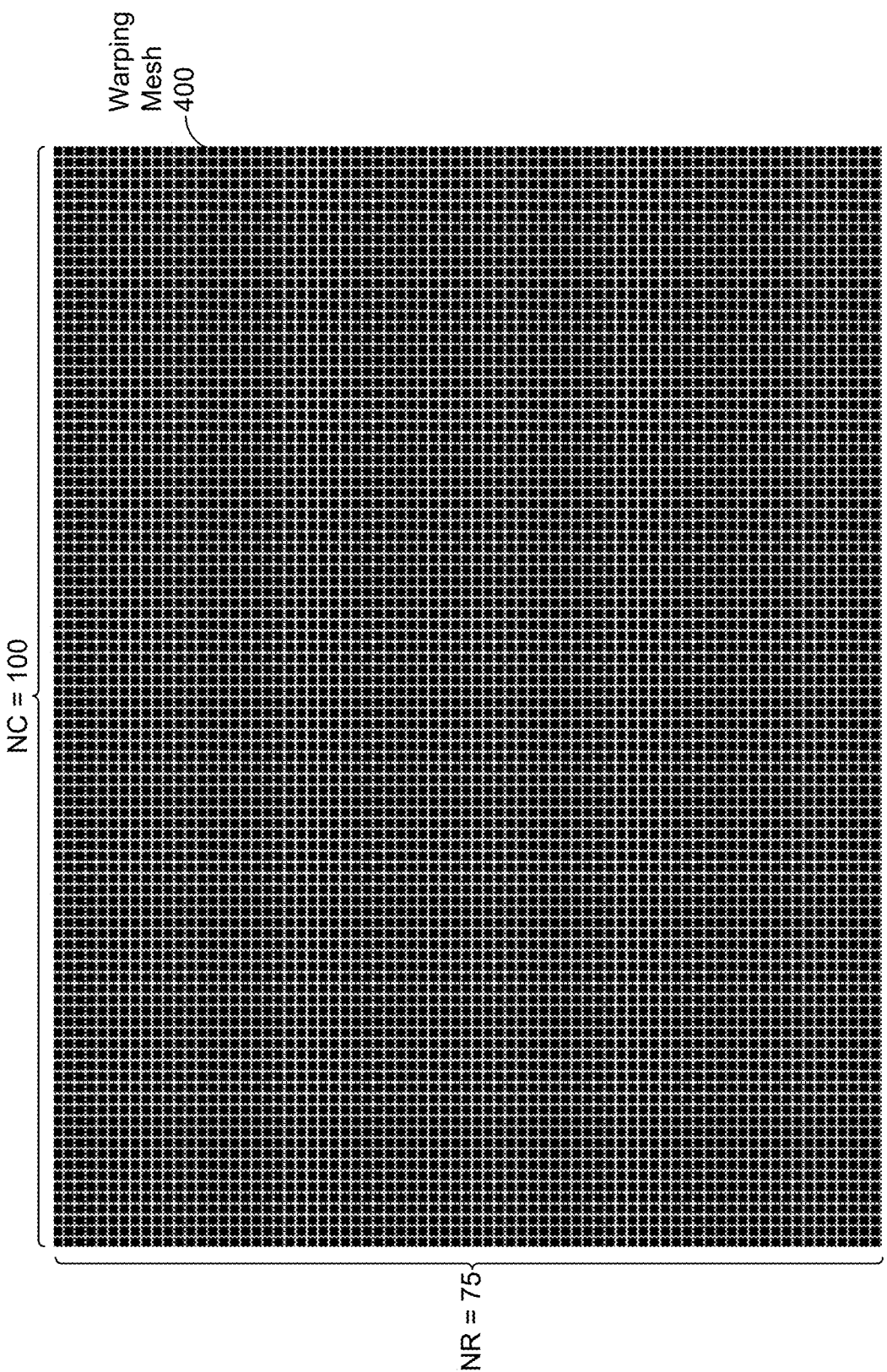
FIG. 4 shows a warping mesh for the input image of FIG. 2, in accordance with an example embodiment.

At block 140, the computing device can create at least one warping mesh v having NR×NC vertices for image I, where each of NR and NC is greater than 0. As an example related to block 140, FIG. 4 shows warping mesh 400, where NR=75=a number of rows of warping mesh 400, and NC=100=a number of columns of warping mesh 400.

At block 150, the computing device can update warping mesh v with costs associated with performing one or more face-related transformations for the N faces in image I in locations of mesh v corresponding to mask M. For example, the costs associated with performing one or more face-related transformations can be termed face-related costs. The face-related transformation(s) can correct(s) one or more geometric distortions of at least one of the N faces. Detailed procedures related to block 150 are described below in the context of FIG. 9.

At block 160, the computing device can update mesh v with costs associated with performing one or more edge-related transformations for preserving straightness of edges of the image modified at least by the one or more face-related transformations and with costs for boundaries of warping mesh v. For example, the costs associated with performing one or more edge-related transformations can be termed edge-related costs. Detailed procedures related to block 160 are described below in the context of FIG. 10. In some examples, one or more projection transformations can combine both the one or more face-related transformations and the one or more edge-related transformations; in some of these examples, the face-related costs and the edge-related costs can be combined as projection costs (corresponding to the combined projection transformations).

At block 170, the computing device can determine optimized mesh v' based on a numerical optimization, such as a minimization, of cost terms of vertices of warping mesh v as updated in blocks 150 and 160. Detailed procedures related to block 170 are described below in the context of FIG. 11.

Figure 5:
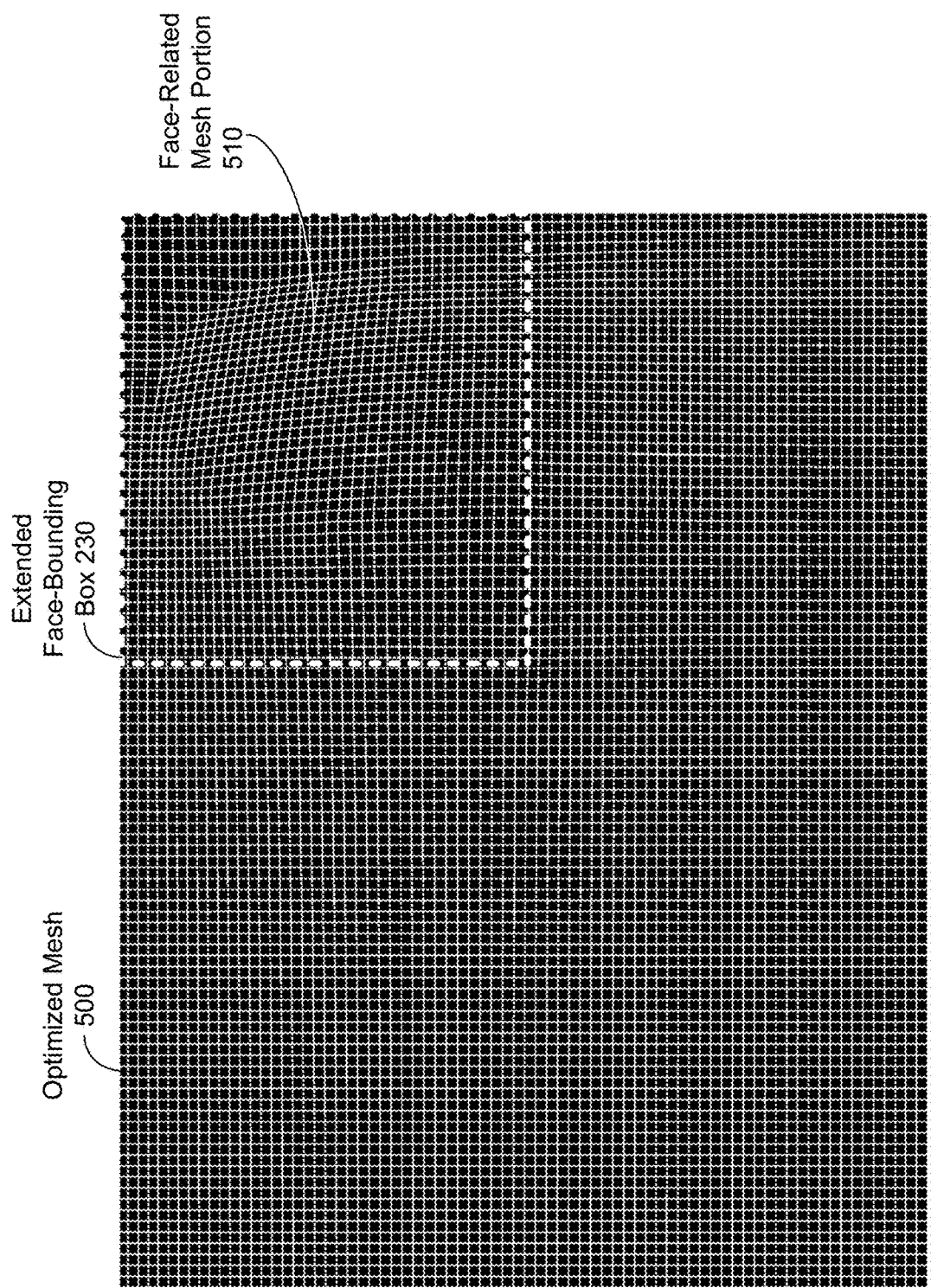
FIG. 5 shows an optimized mesh for the input image of FIG. 2, in accordance with an example embodiment.

As an example related to block 170, FIG. 5 shows optimized mesh 500, which shows warping mesh 400 updated and optimized with a face-related mesh portion 510 associated with face 210, extended face box 230, and segmentation mask 310. Face-related mesh portion 510 has been updated with costs associated with performing face-related transformations for face 210 in input image 200. Further, the costs associated with performing face-related transformations have been optimized; e.g., minimized using numerical optimization. The face-related transformations are reflected in FIG. 5 as deformations of optimized mesh 500 within face-related mesh portion 510. As with warping mesh 400, optimized mesh 500 has a number of rows NR=75 a number of columns NC=100.

At block 180, the computing device can determine inverse mesh z by resampling optimized mesh v'. Detailed procedures related to block 180 are described below in the context of FIG. 12.

At block 190, the computing device can determine output image O by at least: for each pixel P(O) of image O, update P(O) based on a sample of image I taken at sampling coordinates determined based on inverse mesh z. Detailed procedures related to block 190 are described below in the context of FIG. 13.

After output image O is determined, the computing device can output image O; e.g., display part or all of image O, store part or all of image O in volatile and/or non-volatile memory; communicate part or all of image O to one or more other computing devices, print image O to paper, etc.

Figure 6:
FIG. 6 shows an output image that includes facial corrections of the input image of FIG. 2, in accordance with an example embodiment.

As an example related to block 190, FIG. 6 shows output image 600 that corrects input image 200. In particular, face 610 in output image 600 has been rotated and scaled in comparison to face 210 of input image 200, where face 610 has been rotated and scaled by the face-related transformations discussed above in the context of at least block 150. Output image 600 also shows that straight lines have been preserved; e.g., straight lines outlining doors, door frames, etc. with respect to wall 640 as represented in output image 600 are also shown as straight lines with respect to wall 240 represented in input image 200. Other straight lines and angles between straight lines outside of extended face-box 230 are the same in both input image 200 and output image 600. Thus, output image 600 has been rendered by the procedures of method 100 that involve warping input image 200 to correct perspective distortions within extended face-box 230. Further, as shown by comparing images 200 and 600, method 100 did not add (at least) straight-line related visual artifacts to input image 200 while generating output image 600.

Method 100 can be configured with privacy controls to ensure privacy of one or more persons whose faces are present in the images processed by method 100. For example, the computing device can obtain explicit permission from each person whose face is represented by a face box $FB_k$—the computing device can present the faces in face boxes $FB_k$, where k ranges from 1 to N, perhaps after the face boxes have been extended in block 120. Then, permission can be obtained to process input image I from each person whose face is in face boxes $FB_k$ before proceeding with the remainder of method 100; i.e., the computing device can display the face boxes $FB_k$ to request approval from each person whose face is in a displayed face box.

In other examples, the one or more persons whose faces are in an image can give prior approval to perform method 100 before input image I is received at block 110, and computing device can verify that approval as needed before performing method 100. In still other examples, such permissions may be implicit; e.g., if the owner of the computing device captures their own face and only their own face in a "selfie" image and then requests image correction using method 100, the owner's permission to proceed to perform method 100 solely for their own face may be inferred by their request for image correction on the selfie. Combinations of these privacy-related techniques and/or other techniques for ensuring privacy of persons whose faces are captured in input image I and/or other images are possible as well.

Figure 7:
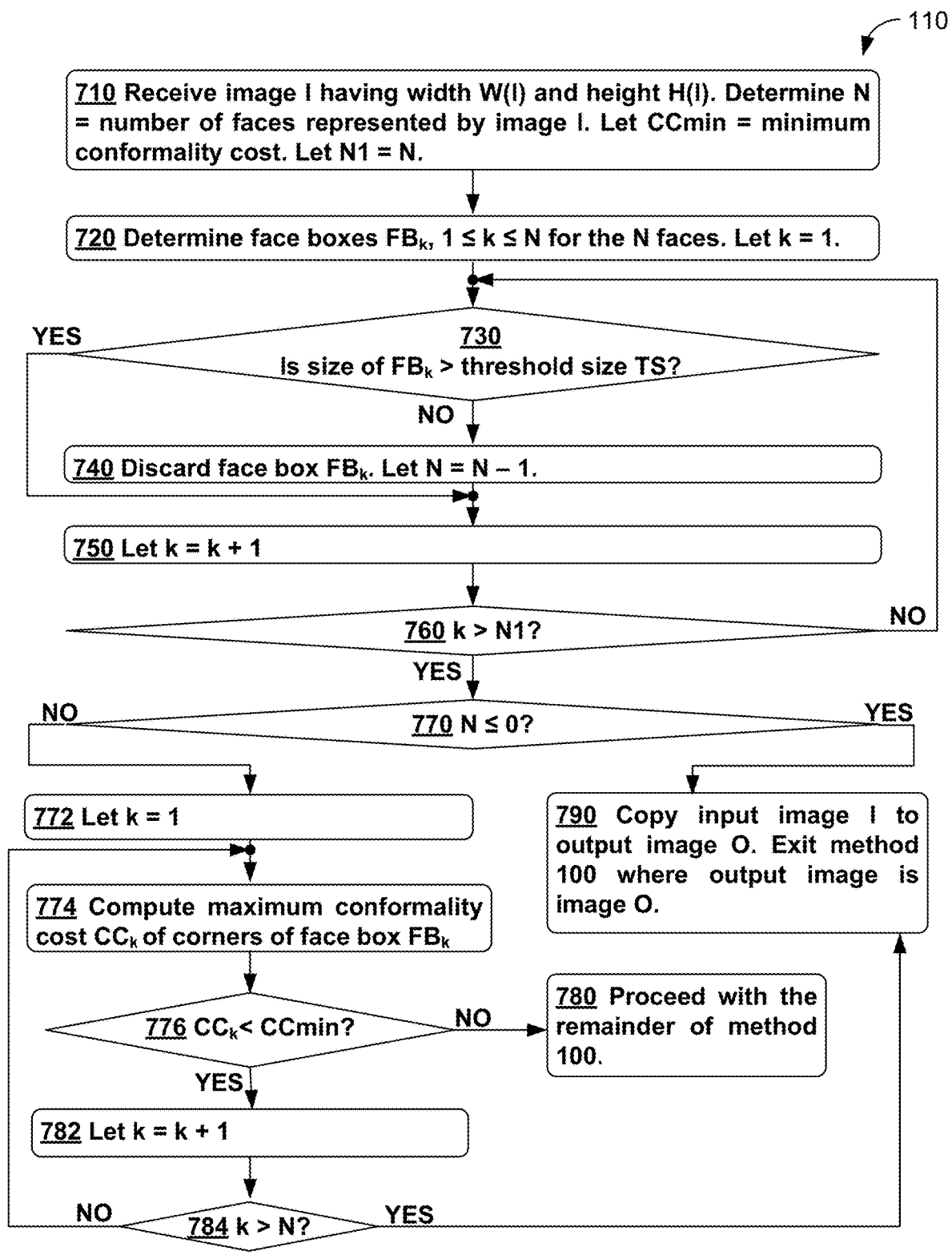
FIG. 7 is a flowchart of a method, in accordance with an example embodiment.

FIG. 7 is a flowchart of a method for the procedures of block 110 of method 100, in accordance with an example embodiment. For example, the computing device performing method 100 can perform at least some of the procedures of blocks 710, 720, 730, 740, 750, 760, 770, 772, 774, 776, 780, 782, 784, and 790, while performing the procedures of block 120 of method 100.

At block 710, the computing device can receive input image I having width W(I) and height H(I). The computing device can determine N, which is a number of faces, such as but not limited to a number of human faces, represented by image I. For example, input image 200 of FIG. 2 represents N=1 human face. The computing device can determine a minimum conformality cost CCmin for a face, where conformality costs for faces are discussed in more detail below in the context of at least blocks 774 and 776. The computing device can let a value N1 be equal to N.

At block 720, the computing device can determine face boxes $FB_k$, 1≤k≤N for the N faces. To determine N and/or some or all of face boxes $FB_1$, $FB_2$ ... $FB_N$, the computing device can utilize face detection software that locates and/or counts faces in image I and/or computes face boxes for faces detected in image I. The computing device can let a value k be equal to 1.

At block 730, the computing device can determine whether a size, such as an area, of face box $FB_k$ is greater than a threshold size of a face box TS. If the computing device determines that the size of face box $FB_k$ is greater than TS, then the computing device can proceed to block 750. Otherwise, the computing device can determine that the size of face box $FB_k$ is less than or equal to TS, and can proceed to block 740.

At block 740, the computing device can discard face box $FB_k$. By discarding face box $FB_k$, the computing device effectively will no longer process a facial portion of the image associated with face box $FB_k$ as a face. Then, the computing device can decrement the value of N by one; that is, the computing device can let N=N−1.

At block 750, the computing device can increment the value of k by 1; that is, the computing device can let k=k+1.

At block 760, the computing device can determine whether k is greater than N1. If the computing device determines that k is greater than N1, then the computing device can proceed to block 770. Otherwise, the computing device can determine that k is less than or equal to N1, and can proceed to block 730.

At block 770, the computing device can determine whether N is less than or equal to 0. If the computing device determines that N is less than or equal to 0, then no faces in image I have corresponding face boxes that exceed threshold size TS, and so the computing device can proceed to block 790. Otherwise, the computing device can determine that N is greater than 0, and can proceed to block 772.

At block 772, the computing device can set the value of k equal to 1.

At block 774, the computing device can determine a maximum conformality cost $CC_k$ of the four corners C1, C2, C3, and C4 of face box $FB_k$. The conformality cost $CC_k$ for face box $FB_k$ can be determined as a weighted sum of squares of differences of coordinates of the corners C1, C2, C3, and C4 of face box $FB_k$, where a difference of coordinates of the corners in at least one dimension are further weighted by a value that is based on the area of face box $FB_k$.

At block 776, the computing device can determine whether conformality cost $CC_k$ for face box $FB_k$ is less than the minimum conformality cost CCmin. If the computing device determines that $CC_k$ is less than CCmin, then the computing device can proceed to block 782. Otherwise, the computing device can determine that $CC_k$ is greater than or equal to CCmin and the computing device can proceed to block 780.

At block 780, the computing device can proceed with the remainder of method 100; i.e., complete the procedures of block 110 of method 100 and continue method 100 by beginning performance of the procedures of block 120 of method 100.

At block 782, the computing device can increment the value of k by 1; that is, the computing device can let k=k+1.

At block 784, the computing device can determine whether k is greater than N. If the computing device determines that k is greater than N, then the computing device can proceed to block 790. Otherwise, the computing device can determine that k is less than or equal to N, and can proceed to block 774.

At block 790, the computing device can copy input image I to output image O; i.e., generate a copy of input image I as output image O. The computing device can exit method 100 where image O is an output of method 100.

Figure 8:
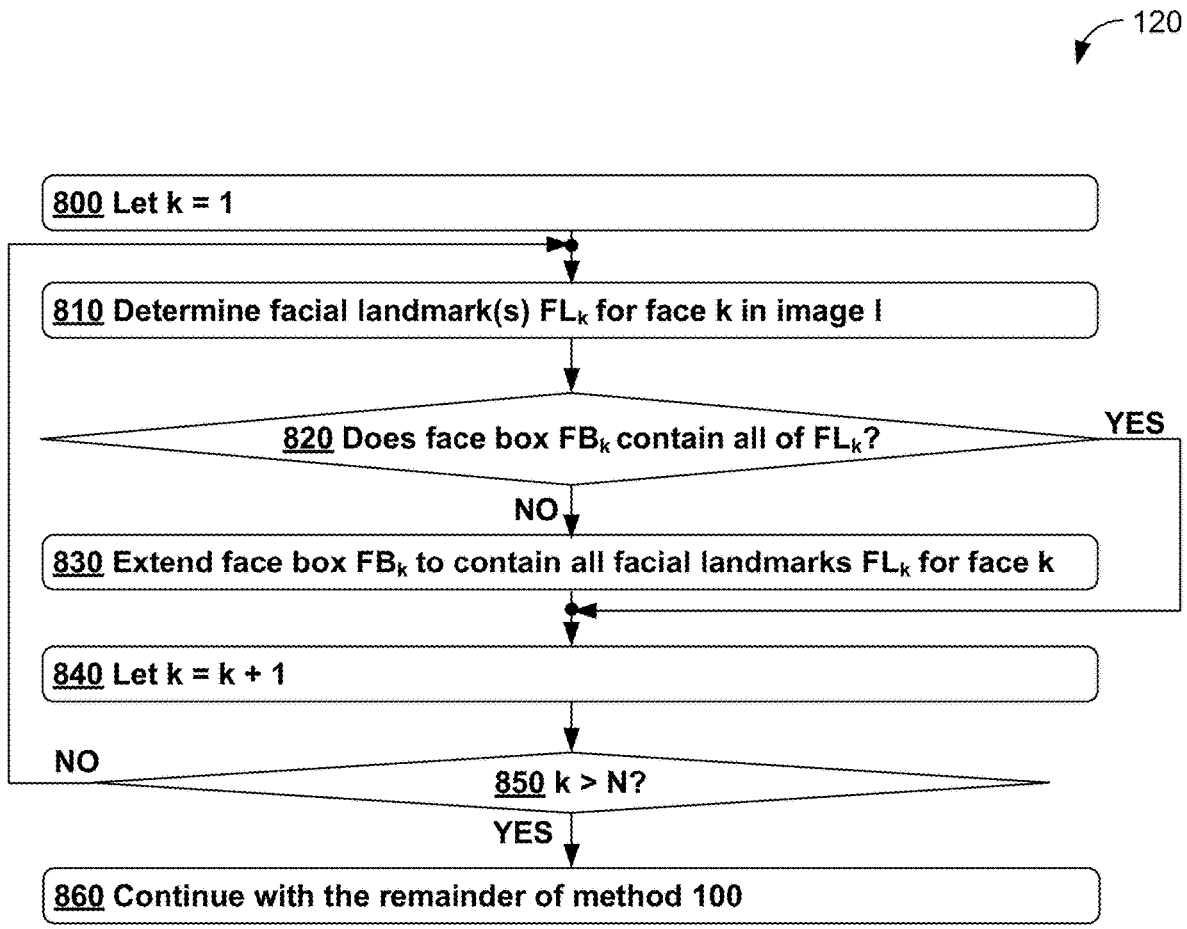
FIG. 8 is a flowchart of a method, in accordance with an example embodiment.

FIG. 8 is a flowchart of a method for the procedures of block 120 of method 100, in accordance with an example embodiment. For example, the computing device performing method 100 can perform some or all of the procedures of blocks 800, 810, 820, 830, 840, 850, and 860 while performing the procedures of block 120 of method 100.

At block 800, the computing device can let and/or initialize a value k to be equal to 1.

At block 810, the computing device can determine one or more facial landmarks $FL_k$ for face k in image I.

At block 820, the computing device can determine whether face box $FB_k$ for face k contains all of facial landmark(s) $FL_k$. For example, the computing device can determine whether coordinates of each facial landmark FL are inside or outside face box $FB_k$. If the coordinates of all of facial landmark(s) $FL_k$ are inside face box $FB_k$, then the computing device can determine that face box $FB_k$ contains all of facial landmark(s) $FL_k$ and so encloses an area of image I that represents face k, and the computing device can proceed to block 840. Otherwise, the computing device can determine that face box $FB_k$ does not contain all of facial landmark(s) $FL_k$ and the computing device can proceed to block 830.

At block 830, the computing device can extend face box $FB_k$ to contain all of facial landmark(s) $FL_k$. As such, after extension at block 830, face box $FB_k$ encloses an area of image I that represents face k At block 840, the computing device can increment the value of k by 1; that is, the computing device can let k=k+1.

At block 850, the computing device can determine whether k is greater than N. If the computing device determines that k is greater than N, then the computing device can proceed to block 860. Otherwise, the computing device can determine that k is less than or equal to N, and can proceed to block 810.

At block 860, the computing device can proceed with the remainder of method 100; i.e., complete the procedures of block 120 of method 100 and continue method 100 by beginning performance of the procedures of block 130 of method 100.

Figure 9:
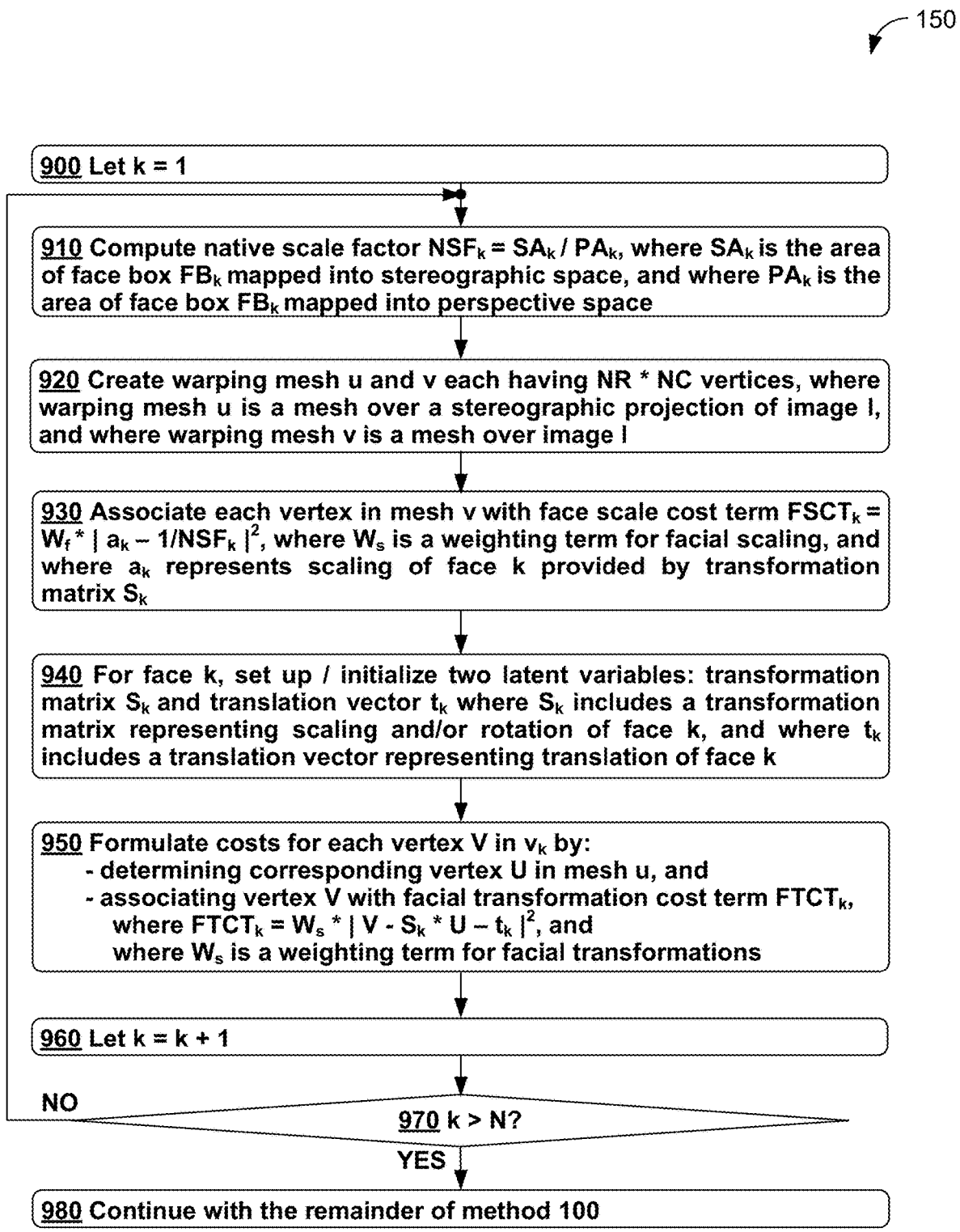
FIG. 9 is a flowchart of a method, in accordance with an example embodiment.

FIG. 9 is a flowchart of a method for the procedures of block 150 of method 100, in accordance with an example embodiment. For example, the computing device performing method 100 can perform some or all of the procedures of blocks 900, 910, 920, 930, 940, 950, 960, 970, and 980 while performing the procedures of block 150 of method 100.

At block 900, the computing device can let and/or initialize a value k to be equal to 1.

At block 910, the computing device can compute an area $SA_k$ of face box $FB_k$ mapped into stereographic space and compute another area $PA_k$ of face box $FB_k$ mapped into perspective space. Then, the computing device can compute native scale factor $NSF_k$ for face k as $NSF_k=SA_k/PA_k$. The native scale factor $NSF_k$ can indicate how a size of face k, which is enclosed by face box $FB_k$, changes after stereographic projection.

At block 920, the computing device can create warping meshes u and v, where each of warping meshes u and v have NR×NC vertices, where NR=number of rows is greater than 0, and where NC=number of rows is greater than 0. For example, NR=100, and NC=75, and, in this example, each of meshes u and v would have NR*NC=7500 vertices. Warping mesh v can be a mesh (of vertices) over image I, perhaps after image I has been lens corrected. Warping mesh u can be a warping mesh (of vertices) over a stereographic projection of image I. Other examples of warping mesh u and/or warping mesh v are possible as well.

At block 930, the computing device can associate each vertex in mesh v with face scale cost term $FSCT_k$ for face k. The face scale cost term $FSCT_k$ can represent an amount of scaling for face k to be performed to correct distortions of face k as represented in image I. $FSCT_k$ can be computed as $FSCT_k=W_f*|a_k-1/NSF_k|^2$, where $W_s$ is a weighting term for facial scaling, where $NSF_k$ is the native scale factor term for face k discussed above in the context of block 910, and where $a_k$ represents scaling of face k provided by transformation matrix $S_k$, which is discussed immediately below.

At block 940, the computing device can set up and/or initialize two implicit variables for face k: transformation matrix $S_k$ and translation vector $t_k$. $S_k$ can include a transformation matrix representing scaling and/or rotation of face k and $t_k$ can include a translation vector representing translation of face k. For example, $S_k$ can include a per-face rigid transformation matrix $[a_k\ b_k;\ -b_k\ a_k]$, representing the combination of scaling transformation $a_k$ and rotation transformation $b_k$ for face k, and $t_k$ can include a per-face translation vector $[tx_k,\ ty_k]$, with $tx_k$ and $ty_k$ representing respective x-coordinate and y-coordinate translations of face k. The scaling, rotation, and/or translation of face k represented by matrix $S_k$ and vector $t_k$ can be transformations, such as affine transformations, that can correct one or more geometric distortions of face k as represented in image I.

At block 950, the computing device can formulate costs for each vertex V in warping mesh $v_k$ by performing the following functions: (1) determine corresponding vertex U in mesh u, and (2) associate vertex V with facial transformation cost term $FTCT_k$. The transformation cost term $FTCT_k$ can represent an amount of transformations for face k to be performed to correct distortions of face k as represented in image I. $FTCT_k$ can be computed as $FTCT_k=W_s*|V-S_k*U-t_k|^2$, where $W_s$ is a weighting term for facial transformations, $S_k$ is the implicit variable and transformation matrix discussed above in the context of block 940, and $t_k$ is the implicit variable and translation vector discussed above in the context of block 940.

At block 960, the computing device can increment the value of k by 1; that is, the computing device can let k=k+1.

At block 970, the computing device can determine whether k is greater than N. If the computing device determines that k is greater than N, then the computing device can proceed to block 980. Otherwise, the computing device can determine that k is less than or equal to N, and can proceed to block 910.

At block 980, the computing device can proceed with the remainder of method 100; i.e., complete the procedures of block 150 of method 100 and continue method 100 by beginning performance of the procedures of block 160 of method 100.

Figure 10:
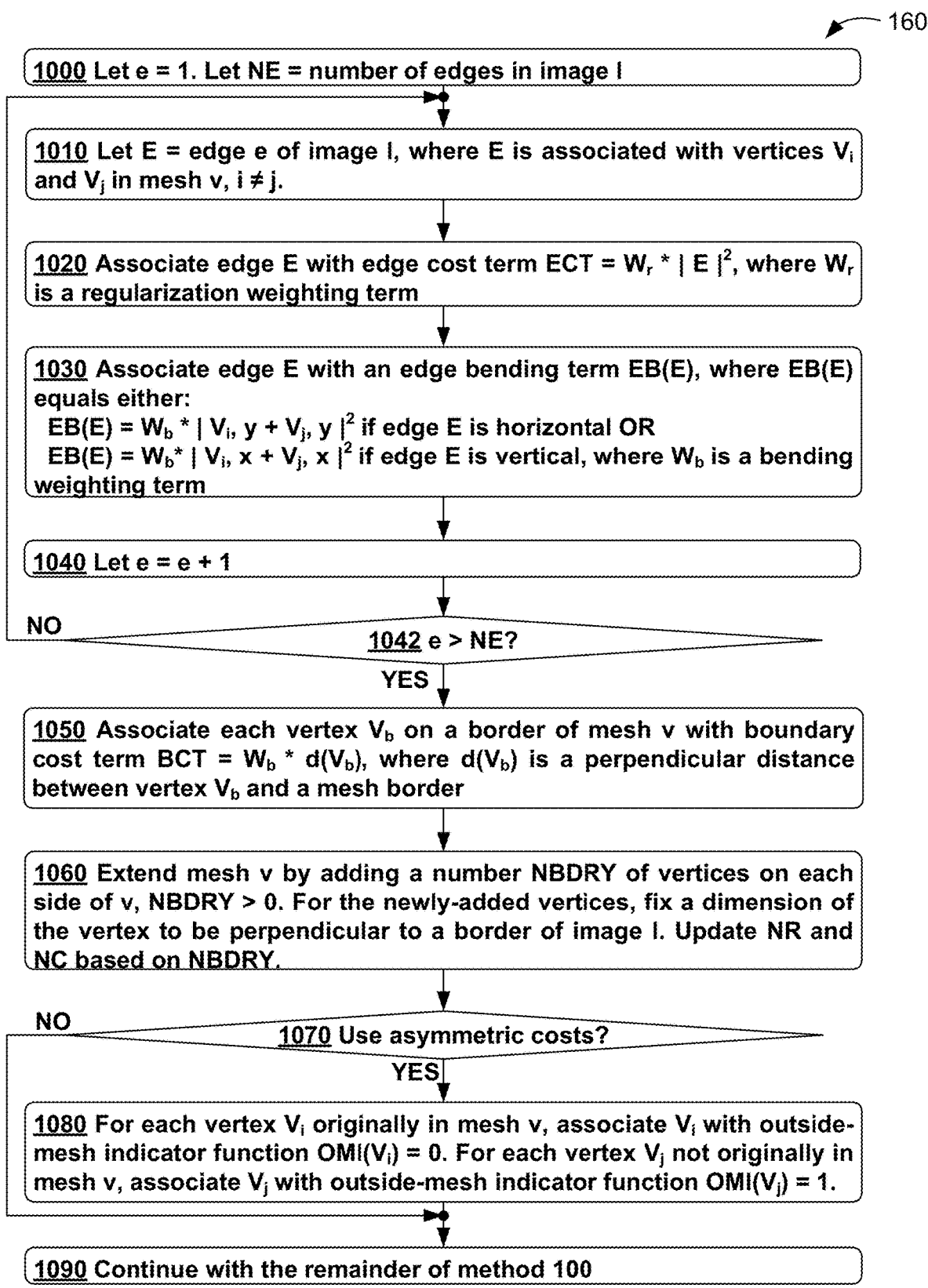
FIG. 10 is a flowchart of a method, in accordance with an example embodiment.

FIG. 10 is a flowchart of a method for the procedures of block 160 of method 100, in accordance with an example embodiment. For example, the computing device performing method 100 can perform some or all of the procedures of blocks 1000, 1010, 1020, 1030, 1040, 1042, 1050, 1060, 1070, 1080, and 1090 while performing the procedures of block 160 of method 100.

At block 1000, the computing device can let and/or initialize a value e to be equal to 1 and let and/or initialize a value NE to be equal to a number of edges and/or other lines represented in image I. For example, a line-detecting algorithm can be used to detect edges and/or other lines represented in image I, and the value NE can be set to the number of edges and/or other lines detected in image I. Other techniques for determining the value NE are possible as well.

At block 1010, the computing device can set a value E to be equal to edge e of image I, where E is associated with vertices $V_i$ and $V_j$ in mesh v, and where i≠j.

At block 1020, the computing device can associate edge E with an edge cost term ECT that represents a cost associated with maintaining edge E. ECT can be calculated as $ECT=W_r*|E|^2$, where $|E|^2$ represents a length of edge E, and where $W_r$ is a regularization weighting term.

At block 1030, the computing device can associate edge E with an edge bending term EB(E) that represents a cost associated with bending edge E after edge E has been transformed. EB(E) can equal one of two values, depending on a horizontal or vertical orientation of edge E. More specifically, EB(E) can be determined as either:

$$EB(E)=W_b*|V_i.y+V_j.y|^2,\text{ if edge}E\text{ is horizontal; or}$$

$$EB(E)=W_b*|V_i.x+V_j.x|^2,\text{ if edge}E\text{ is vertical.}$$

where $W_b$ can be a bending weighting term.

At block 1040, the computing device can increment the value of e by 1; that is, the computing device can let e=e+1.

At block 1042, the computing device can determine whether e is greater than NE. If the computing device determines that e is greater than NE, then the computing device can proceed to block 1050. Otherwise, the computing device can determine that e is less than or equal to NE, and can proceed to block 1010.

At block 1050, the computing device can associate each vertex $V_b$ on a border of mesh v with a boundary cost term BCT. BCT can be calculated as $BCT=W_b*d(V_b)$, where $d(V_b)$ is a perpendicular distance between vertex $V_b$ and a border of mesh v, and where $W_b$ can be the bending weighting term discussed above in the context of block 1030.

At block 1060, the computing device can extend mesh v by a number NBDRY of vertices on each side, NBDRY>0. For example, NBDRY can be an integer value, such as 1, 2, 3, 4, or another integer value. For each vertex that is added to warping mesh v by extend the mesh by NBDRY vertices, the computing device can fix a dimension of the vertex to be perpendicular to a border of image I. Then, the computing device can update number of rows NR of mesh v and the number of columns NC based on NBDRY; e.g., NR=NR+NBDRY and NC=NC+NBDRY.

At block 1070, the computing device can determine whether asymmetric costs are to be used in method 100. For example, a variable, value, flag or other similar data item ACFLAG can be set to a first value (e.g., one) if asymmetric costs are to be used in method 100, and can be set to a second value (e.g., zero) if asymmetric costs are not to be used in method 100. Then, the computing device can examine the value of ACFLAG to determine whether asymmetric costs are to be used in method 100. If the computing device determines that asymmetric costs are to be used in method 100, then the computing device can proceed to block 1080. Otherwise, the computing device can determine that asymmetric costs are not to be used in method 100 and can proceed to block 1090.

At block 1080, the computing device can, for each vertex V, originally in mesh v (i.e., a vertex of mesh v that was not added at block 1060), associate vertex V, with outside-mesh indicator function $OMI(V_i)=0$. For each vertex $V_j$ not originally in mesh v (i.e., a vertex of mesh v that was added at block 1060), the computing device can associate $V_j$ with outside-mesh indicator function $OMI(V_j)=1$.

At block 1090, the computing device can proceed with the remainder of method 100; i.e., complete the procedures of block 160 of method 100 and continue method 100 by beginning performance of the procedures of block 170 of method 100.

Other cost functions than those described in the context of FIGS. 9 and 10 are possible as well. Also, in some examples, the relative weights of the cost functions can be modified and/or the stereographic projection used in creating warping mesh u can be replaced with one or more other projections.

Figure 11:
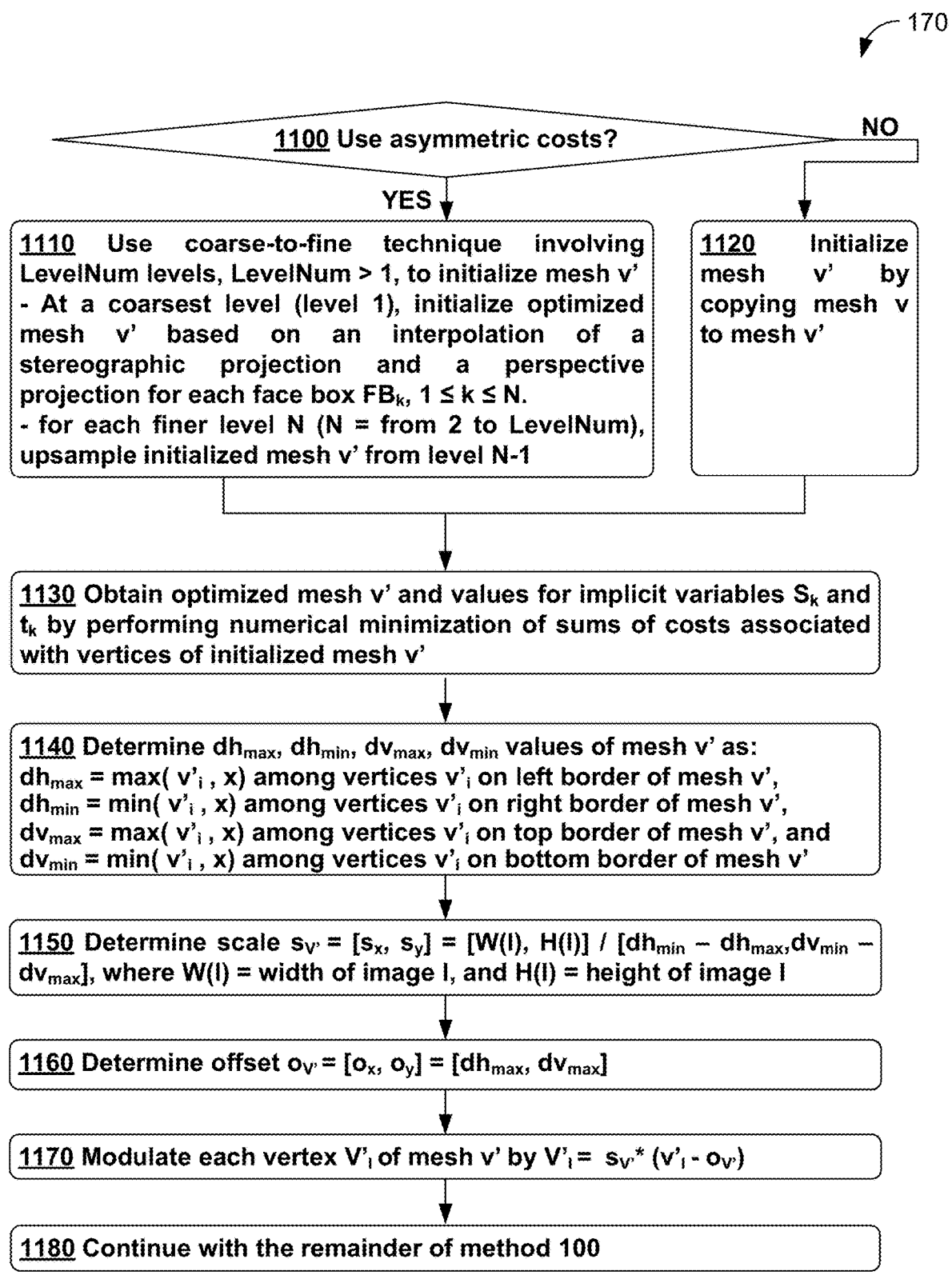
FIG. 11 is a flowchart of a method, in accordance with an example embodiment.

FIG. 11 is a flowchart of a method for the procedures of block 170 of method 100, in accordance with an example embodiment. For example, the computing device performing method 100 can perform some or all of the procedures of blocks 1100, 1110, 1120, 1130, 1140, 1150, 1160, 1170, and 1180 while performing the procedures of block 170 of method 100.

At block 1100, the computing device can determine whether asymmetric costs are to be used in method 100. Techniques for determining whether asymmetric costs are to be used in method 100 are discussed above in the context of block 1070. If the computing device determines that asymmetric costs are to be used in method 100, then the computing device can proceed to block 1110. Otherwise, the computing device can determine that asymmetric costs are not to be used in method 100 and can proceed to block 1120.

At block 1110, the computing device can use a coarse-to-fine technique involving LevelNum levels, LevelNum>1, to initialize optimized mesh v'. To carry out the coarse-to-fine technique, the computing device can: (a) at a coarsest level (e.g., level 1), initialize optimized mesh V' based on an interpolation of a stereographic projection and a perspective projection for each face box $FB_k$, 1≤k≤N; and (b) for each finer level N, 2≤N≤LevelNum; upsample initialized mesh V' from level N−1.

At block 1120, the computing device can initialize optimized mesh V' by copying warping mesh V to optimized mesh V'

At block 1130, the computing device can obtain optimized mesh V' and determine values for implicit variables $S_k$ and $t_k$ by performing numerical minimization of sums of costs associated with vertices of initialized mesh V', where $S_k$ is the implicit variable and transformation matrix discussed above at least in the context of block 940, and $t_k$ is the implicit variable and translation vector discussed above at least in the context of block 940.

An example numerical solver that can be used to perform the numerical minimization of sums of costs associated with vertices of initialized mesh V' is the Ceres Solver described on the Internet at ceres-solver.org.

At block 1140, the computing device can compute or otherwise determine $dh_{max}$, $dh_{min}$, $dv_{max}$, $dv_{min}$ values of mesh V'. The $dh_{max}$ value can be determined as $dh_{max}$=max $(v'_i, x)$ among vertices on left border of mesh V'. The $dh_{min}$ value can be determined as $dh_{min}$=min$(v'_i, x)$ among vertices on right border of mesh V'. The $dv_{max}$ value can be determined as $dv_{max}$=max(v'i, x) among vertices on top border of mesh V'. The $dv_{min}$ value can be determined as $dv_{min}$=min $(v'_i, x)$ among vertices on bottom border of mesh V'.

At block 1150, the computing device can determine a scale vector $s_{V'}$, where the scale vector $s_{V'}=[s_x, s_y]=[W(I), H(I)]/[dh_{min}-dh_{max}, dv_{min}-dv_{max}]$, where W(I) can be the width of image I, and H(I) can be the height of image I.

At block 1160, the computing device can determine an offset vector $o_{V'}$, where offset vector $o_{V'}=[O_x, O_y]=[dh_{max}, dv_{max}]$.

At block 1170, the computing device can modulate each vertex of mesh V' by determining $v'_1=s_{V'}*(v'_1-o_{V'})$.

At block 1180, the computing device can proceed with the remainder of method 100; i.e., complete the procedures of block 170 of method 100 and continue method 100 by beginning performance of the procedures of block 180 of method 100.

Figure 12:
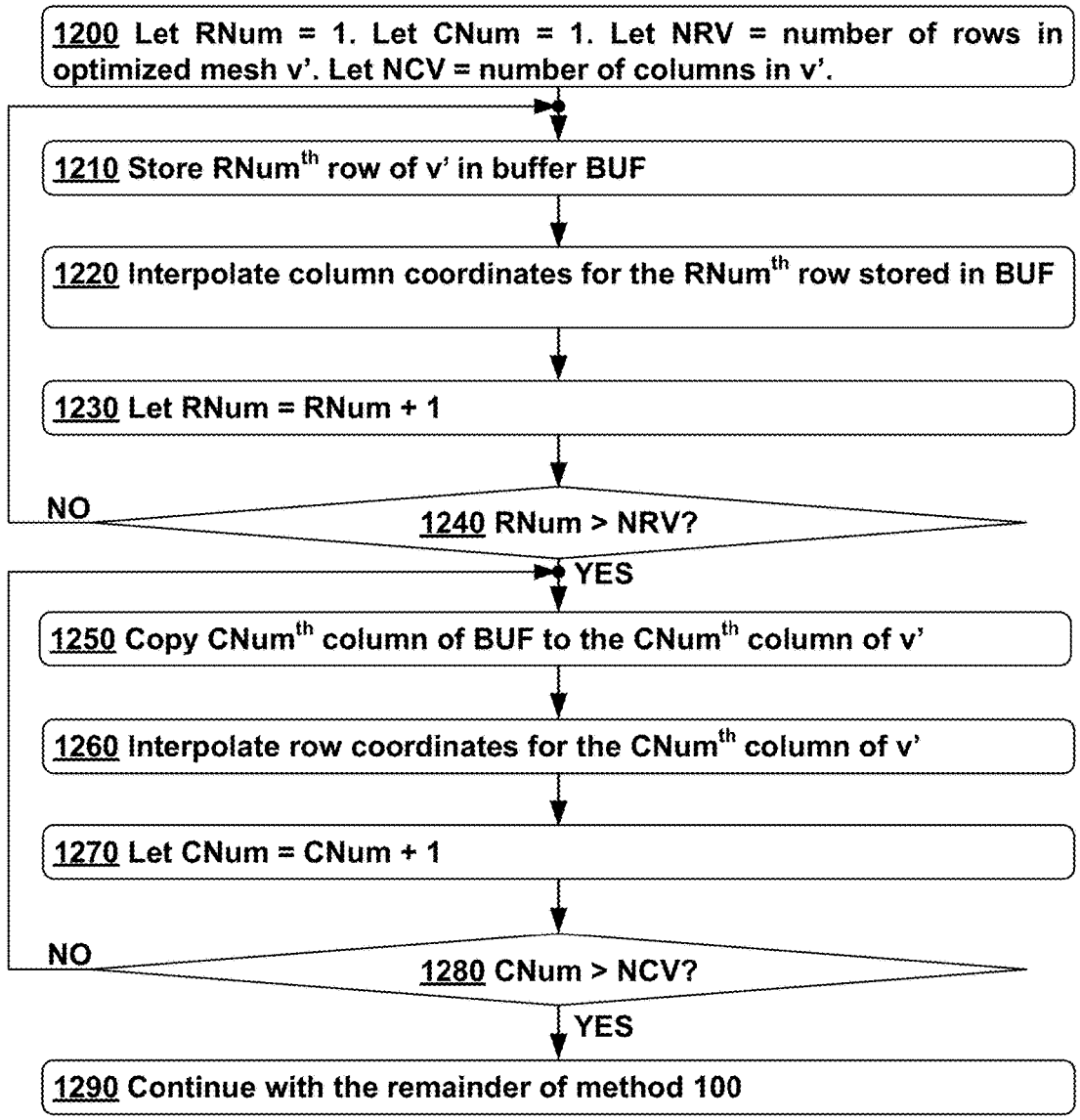
FIG. 12 is a flowchart of a method, in accordance with an example embodiment.

FIG. 12 is a flowchart of a method for the procedures of block 180 of method 100, in accordance with an example embodiment. For example, the computing device performing method 100 can perform some or all of the procedures of blocks 1200, 1210, 1220, 1230, 1240, 1250, 1260, 1270, 1280, and 1290 while performing the procedures of block 180 of method 100. The flowchart of FIG. 12 illustrates a two-pass algorithm for resampling optimal mesh v' to create an inverse mesh z. The first pass of the two-pass algorithm involves the rows of optimized mesh v' as indicated by blocks 1200, 1210, 1220, 1230, and 1240. The second pass of the two-pass algorithm involves the columns of optimized mesh v' as indicated by blocks 1250, 1260, 1270, 1280, and 1290. Other resampling techniques to form inverse mesh z are possible as well.

At block 1200, the computing device can let and/or initialize a value RNum equal to 1 and a value CNum equal to 1 Also, the computing device can let and/or initialize a value NRV to be equal to a number of rows in optimized mesh v' and can let and/or initialize a value NCV to be equal to a number of columns in optimized mesh v'.

At block 1210, the computing device can store an RNum[th] row of v' in buffer BUF.

At block 1220, the computing device can interpolate the column coordinates for the RNum[th] row stored in BUF.

At block 1230, the computing device can increment the value of RNum by 1; that is, the computing device can let RNum=RNum+1.

At block 1240, the computing device can determine whether the RNum value is greater than NRV, whose value is a number of rows in optimized mesh v'. If the computing device determines that the RNum value is greater than NRV, then the computing device can proceed to block 1250. Otherwise, the computing device can determine that the RNum value is less than or equal to NRV and can proceed to block 1210.

At block 1250, the computing device can copy a CNum$^{th}$ column of buffer BUF to the CNum$^{th}$ column of optimized mesh v'.

At block 1260, the computing device can interpolate row coordinates for the CNum$^{th}$ column of v'.

At block 1270, the computing device can increment the value of CNum by 1; that is, the computing device can let CNum=CNum+1.

At block 1280, the computing device can determine whether the CNum value is greater than NCV, whose value is a number of columns in optimized mesh v'. If the computing device determines that the CNum value is greater than NCV, then the computing device can proceed to block 1290. Otherwise, the computing device can determine that the RNum value is less than or equal to NRV and can proceed to block 1250.

At block 1290, the computing device can proceed with the remainder of method 100; i.e., complete the procedures of block 180 of method 100 and continue method 100 by beginning performance of the procedures of block 190 of method 100.

Figure 13:
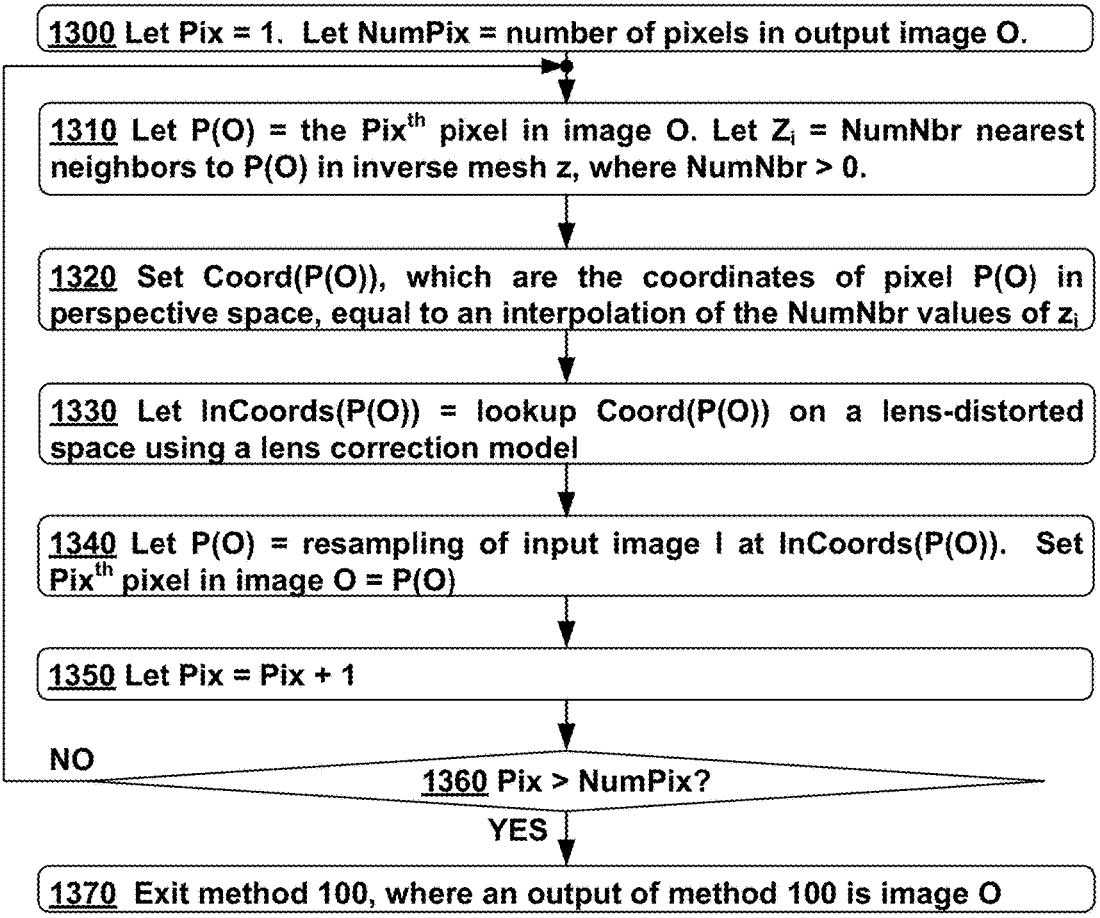
FIG. 13 is a flowchart of a method, in accordance with an example embodiment.

FIG. 13 is a flowchart of a method for the procedures of block 190 of method 100, in accordance with an example embodiment.

For example, the computing device performing method 100 can perform some or all of the procedures of blocks 1300, 1310, 1320, 1330, 1340, 1350, 1360, and 1370 while performing the procedures of block 190 of method 100.

At block 1300, the computing device can let and/or initialize a value Pix equal to 1 and can let a value NumPix be equal to a number of pixels in output image O.

At block 1310, the computing device can let P(O) be the Pix$^{th}$ pixel in image O and can let $Z_i$ be a number NumNbr of nearest neighbors to P(O) in inverse mesh z, where NumNbr is an integer greater than 0; e.g., NumNbr can equal 1, 2, 3, 4, or another positive integer.

At block 1320, the computing device can set Coord(P(O)), which are coordinates of pixel P(O) in perspective space, equal to an interpolation of the NumNbr values of L.

At block 1330, the computing device can lookup Coord(P(O)) on a lens-distorted space using a lens correction model to find coordinates InCoords(P(O)).

At block 1340, the computing device can let P(O) be equal to a resampling of input image I at coordinates represented by InCoords(P(O)). Then, the computing device can set a Pix$^{th}$ pixel in image O equal to P(O).

At block 1350, the computing device can increment the value of Pix by 1; that is, the computing device can let Pix=Pix+1.

At block 1360, the computing device can determine whether Pix is greater than NumPix. If the computing device determines that Pix is greater than NumPix, then the computing device can proceed to block 1370. Otherwise, the computing device can determine that Pix is less than or equal to NumPix, and can proceed to block 1310.

At block 1370, the computing device can exit method 100, where image O is an output of method 100.

Other techniques to utilize one or more meshes, such as meshes u, v, v', and/or z, to warp an image, such as image I to form an output image, such as image O are possible as well.

Figure 14:
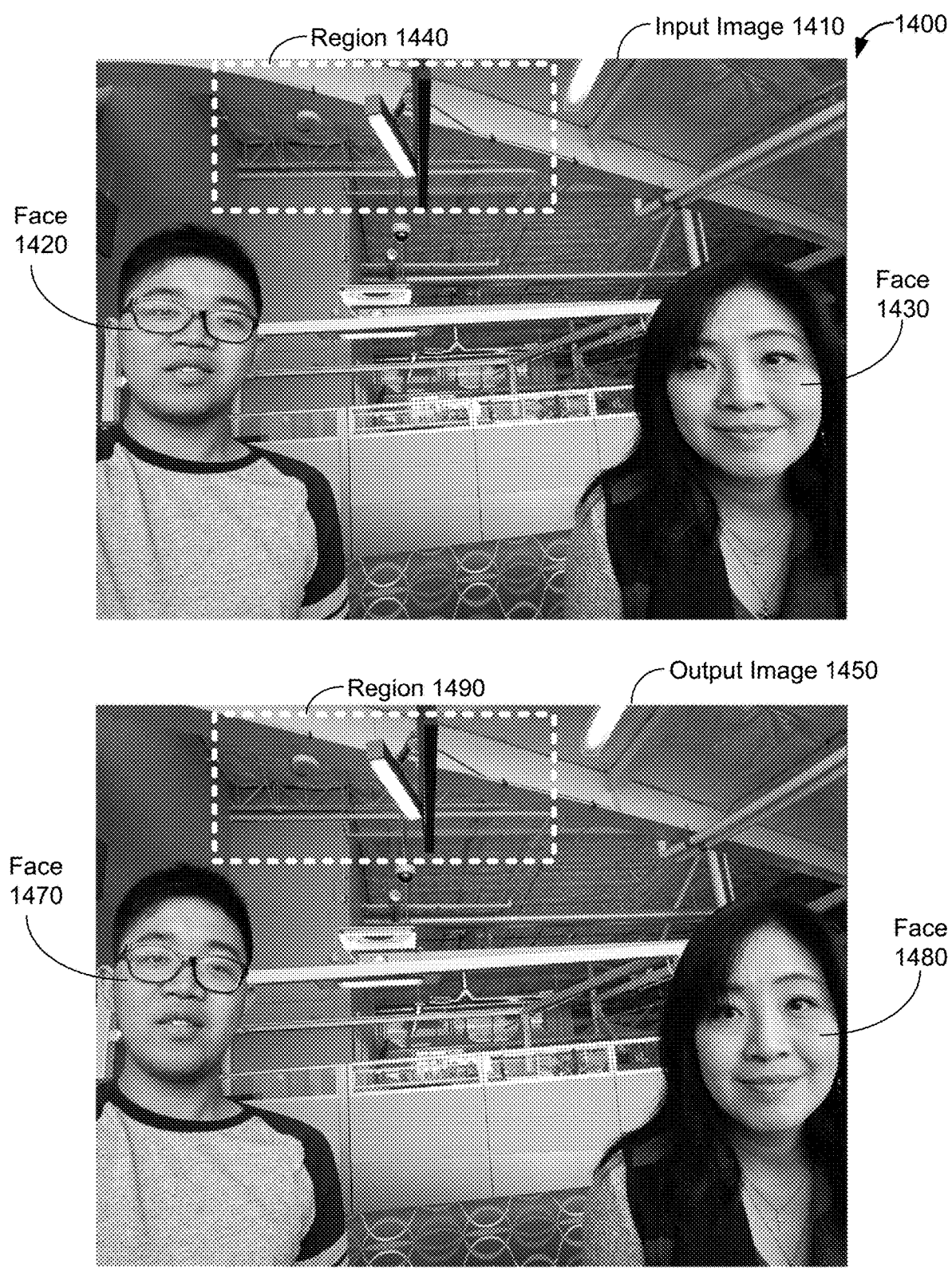
FIG. 14 illustrates a scenario where an input image representing two faces has both faces corrected in a corresponding output image, in accordance with an example embodiment.

FIG. 14 illustrates scenario 1400, where input image 1410 representing two faces 1420, 1430 has both faces corrected in a corresponding output image 1450, in accordance with an example embodiment. Scenario 1400 begins with a computing device that is equipped with a camera; e.g., a smartphone with a camera, uses the camera to capture input image 1410.

As shown at an upper portion of FIG. 14, input image 1410 is an image of two people in a work environment. As such, input image 1410 represents two faces 1420, 1430 of the two people. Input image 1410 also represents region 1440 of a ceiling in the work environment, where region 1440 shows objects appearing to come together at various angles at or near the ceiling.

Scenario 1400 continues with the computing device receiving input image 1410 from the camera, correcting input image 1410 using the techniques of method 100 discussed above, and consequently generating output image 1450. In particular, faces 1420, 1430 of input image 1410 are corrected to be respective faces 1470, 1480 of output image 1450 using affine and/or stereographic transformations as discussed above in the context of method 100. For example, each of faces 1420, 1430 represented in input image 1410 has been rotated and elongated (scaled) to have a more natural shape as shown in respective faces 1470, 1480 of output image 1450.

Additionally, region 1440 of input image 1410 is not corrected while generating output image 1450. In particular, straight lines in region 1440 of input image 1410 remain straight in corresponding region 1490 of output image 1450. Further, lines that intersect in region 1440 of input image 1410 at various angles are shown in region 1490 of output image 1450 as intersecting lines at the same, various angles. Thus, scenario 1400 shows that the computing device can use method 100 to correct faces in images such as input image 1410 without changing straight lines between input image 1410 and output image 1450, other than straight lines and angles in facial regions of input image 1410.

Figure 15:
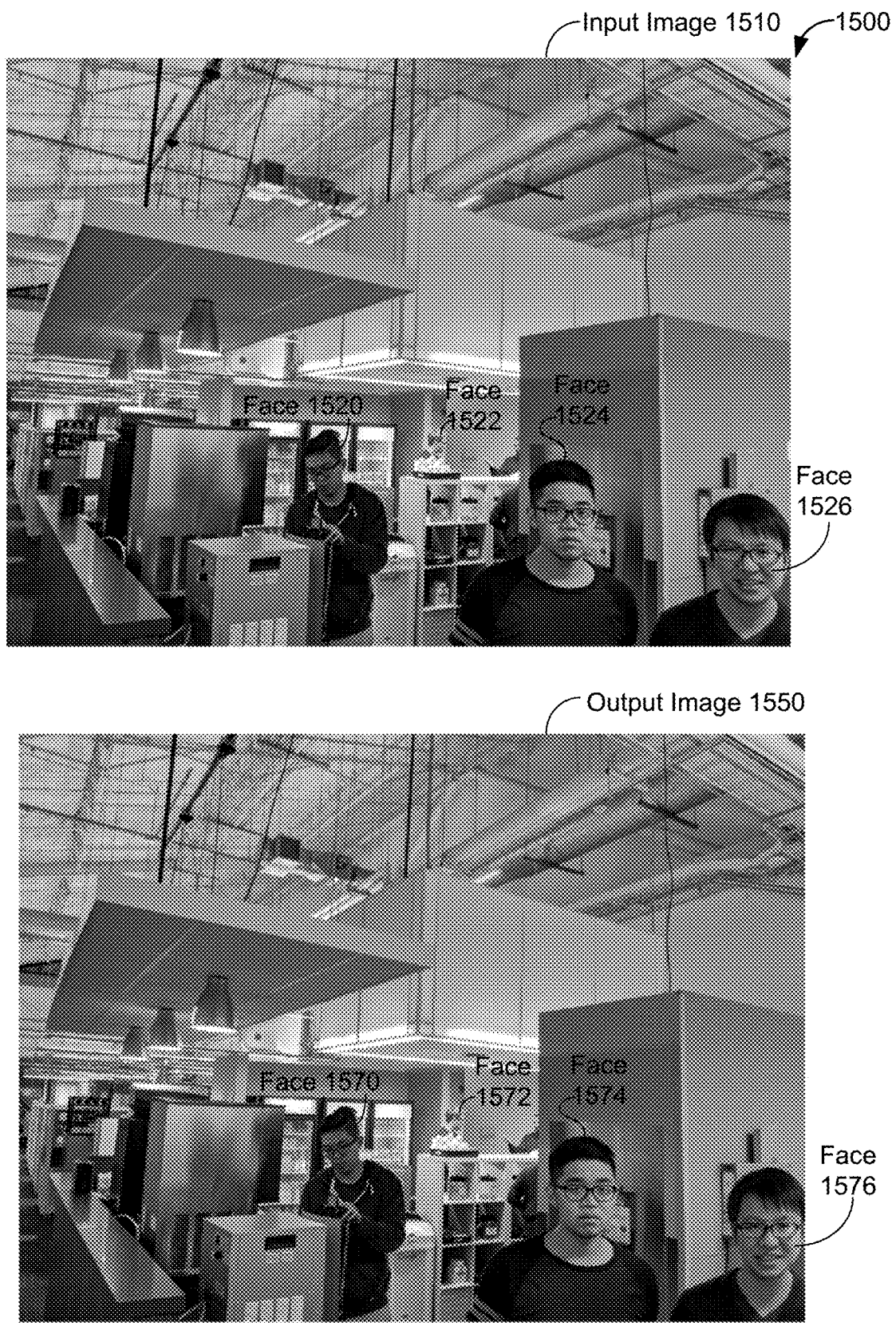
FIG. 15 illustrates a scenario where an input image representing four faces has three of the four faces corrected in a corresponding output image, in accordance with an example embodiment.

FIG. 15 illustrates scenario 1500, where input image 1510 representing four faces 1520, 1522, 1524, 1526 has three of the four faces corrected in corresponding output image 1550, in accordance with an example embodiment. Scenario 1500 begins with a computing device receiving input image 1510 from a camera. As shown at an upper portion of FIG. 15, input image 1510 is an image of at least four people in a work environment. As such, input image 1510 represents at least four faces 1520, 1522, 1524, 1526 of at least four people.

Scenario 1500 continues with the computing device correcting input image 1510 using the techniques of method 100 discussed above and consequently generating output image 1550. In scenario 1500, face 1522 has an extended face box that is less than the threshold size TS discussed above at least in the context of FIGS. 1 and 7. Therefore, the computing device does not correct face 1522 while generating output image 1550 with corresponding face 1572. Also, each of the extended face boxes of faces 1520, 1524, and 1526 in input image 1510 are greater than the threshold size TS. Scenario 1500 proceeds with the computing device correcting only these three faces 1520, 1524, 1526 of input image 1510; e.g., using affine and/or stereographic transformations, as part of using the procedures of method 100 to generate output image 1550.

The correction of faces 1520, 1524, 1526 of input image 1510 transforms the three faces to be respective faces 1570, 1574, 1576 of output image 1550. e.g., the three faces 1520, 1524, 1526 while generating output image 1550 with corresponding face 1572. Additionally, straight lines and angles of intersection between straight lines in input image 1510 (other than straight lines and angles in facial regions of input image 1510) are not changed in output image 1550; e.g., angles of objects suspended from a ceiling shown in input image 1510. Thus, scenario 1500 illustrates use of method 100 to correct some, but not all, faces without changing straight lines in input image 1510 (outside of straight lines and angles in facial regions of input image 1510) as part of generating output image 1550.

Figure 16:
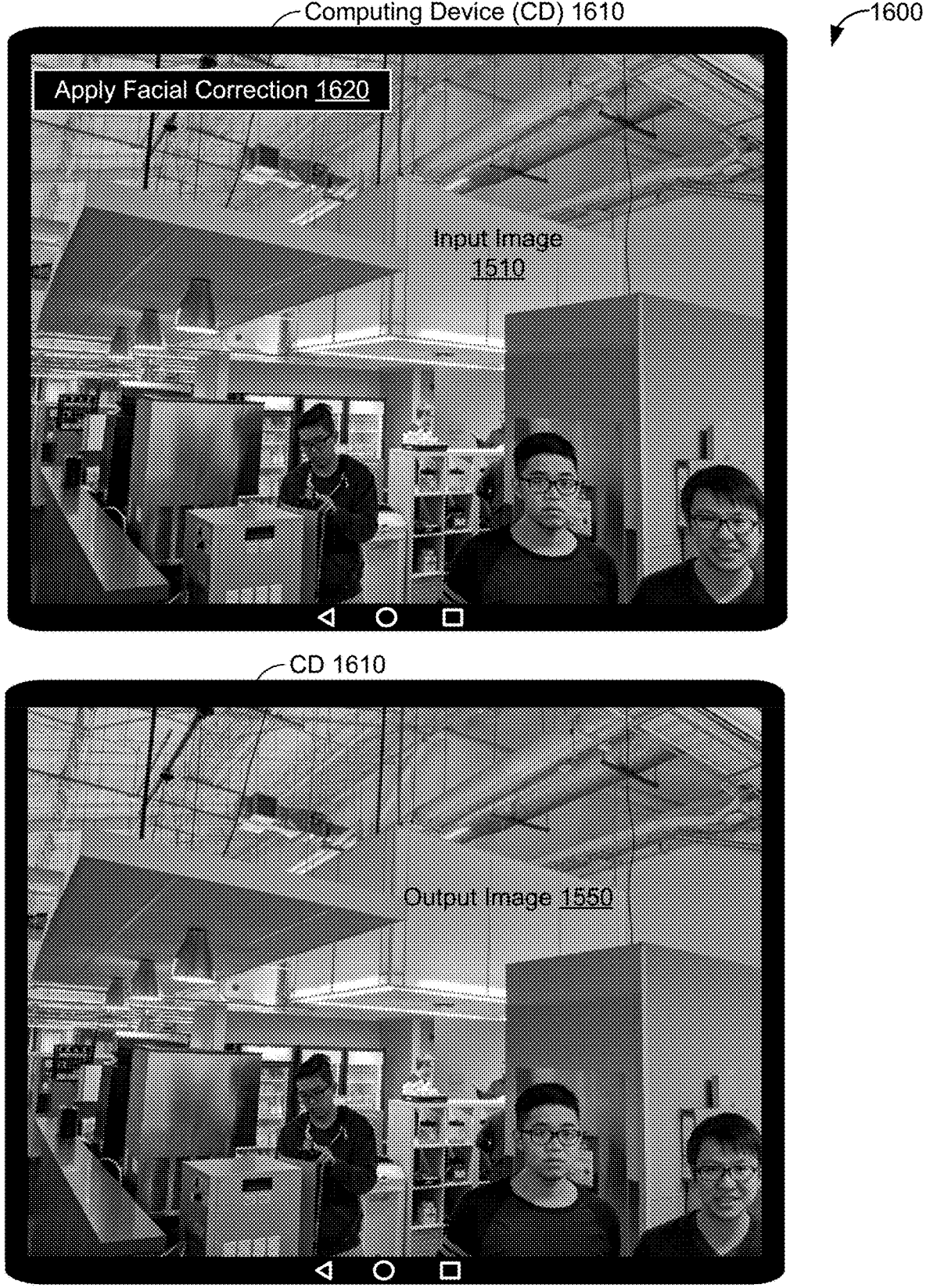
FIG. 16 illustrates a scenario where a computing device displays an input image and a control that, when selected, causes the computing device to generate a corresponding output image 1550 that includes corrections of faces represented in the input image, in accordance with an example embodiment.

FIG. 16 illustrates scenario 1600, where computing device 1610 uses method 100 to correct input image 1510 as part of generating output image 1550, in accordance with an example embodiment. An upper portion of FIG. 16 shows that scenario 1600 begins with computing device 1610 receiving input image 1510 from a camera and then displaying input image 1510 and control 1620, where control 1620 includes a button labeled as "Apply Facial Correction". Control 1620 when selected, causes computing device 1610 to use method 100 to correct an input image; e.g., input image 1510, as part of generating an output image; e.g., output image 1550 In other scenarios, control 1620 can be represented by a graphical object of a graphical user interface (GUI) other than a button; e.g., an icon, a dialog. In still other scenarios, facial correction functionality controlled using control 1620 can be controlled using one or more non-GUI objects; e.g., keys on a keyboard, commands of a command line interface.

Scenario 1600 proceeds with a user of computing device 1610 selecting control 1620; e.g., clicking on control 1620 using a mouse; pressing a location corresponding to control 1620 on a touch screen. After control 1620 is selected, computing device 1610 uses method 100 to generate output image 1550 as discussed above in more detail the context of at least FIGS. 1 and 15. After generating output image 1550, scenario 1600 continues with computing device 1610 displaying output image 1550, as shown at a lower portion of FIG. 16. Output image 1550 has had some but not all, of the faces in input image 1510 corrected without changing straight lines outside of straight lines and angles in facial regions of input image 1510.

In some scenarios, a camera used to capture input image 1410, input image 1510, and/or other input imagery can be equipped with a Wide Field of View (WFOV) (or wide angle) lens and/or a WFOV sensor in order to facilitate capture of a scene from relatively close proximity.

Techniques and Apparatus for Temporally Correcting Perspective Distortion

Generally speaking, the techniques described in FIGS. 1-16 are designed for static input images. For example, method 100 can generate a corrected output image O that corrects perspective distortions in a corresponding input image I. However, when dealing with multiple, successive image frames (e.g., a video stream), applying the techniques of FIGS. 1-16 to each individual image in a per-frame manner may cause problems, such as temporal flickering and/or wobbling between successive images. Further, applying the techniques of FIGS. 1-16 on multiple, successive images may be computationally expensive (e.g., on the order 990 ms/per image when applied via a mobile phone). If a goal of correcting perspective distortion is to provide real time feedback to a user in the form of a "camera preview", the high computational costs may preclude the perspective distortion techniques of FIGS. 1-16 from being incorporated into camera preview systems, which often require real-time, 30 fps processing.

To address these and other issues, a real time perspective distortion correction procedure is provided. The proposed procedure relies on similar techniques as the mesh optimization problem described in FIGS. 1-16, but provides the following additions: (1) a neural network architecture for real-time subject segmentation, and (2) additional costs terms to establish smooth inter-frame warping. By using the techniques described herein, temporal flickering, wobbling problems, and other coherence issues can be resolved and computational costs of correcting perspective distortion can be reduced. Other benefits are also possible.

It should be noted that since the techniques described below build on techniques previously described in FIGS. 1-16, for the purpose of brevity, aspects of FIGS. 1-16 will be referred to and incorporated into the description below. Systems and methods that are distinct to the real time perspective distortion correction procedure will be detailed in the description herein.

FIG. 17 is a flowchart of method 1700, in accordance with an example embodiment. Method 1700 can generate a corrected output image O that corrects perspective distortions for a corresponding input image I at timestep t. Method 1700 can be carried out by a computing device, such as computing device 2300 described below.

Method 1700 can begin at block 1710, where the computing device can receive an input image $I_t$ having width $W(I_t)$ and height $H(I_t)$. Input image $I_t$ represents a single frame from a plurality of frames received by the computing device during a real time image stream. In other words, input image is a frame captured at timestep t, which in terms of the real time image stream sequence, is after a frame captured at timestep t−1 and before a frame captured at timestep t+1. Also, the computing device can determine $N_t$, which is a number of faces represented by image I at timestep t whose sizes are larger than a threshold size. In some embodiments, block 1710 can further involve determining face boxes $FB_k$ for each of the $N_t$ faces, where $1 \leq k \leq N_t$ and extending each face box $FB_k$ as necessary to contain facial landmarks. Detailed procedures related to block 1700 were previously described above in the context of FIG. 7 and FIG. 8.

At block 1720, the computing device can apply a segmentation network to determine a global segmentation mask M for input image $I_t$ In some examples, this involves applying the segmentation network on face boxes $FB_k$ to determine individual segmentation masks Mk for each of the $N_t$ faces, where $1 \leq k \leq N_t$, and then using the computing device to determine a global segmentation mask M as a union of all individual segmentation masks Mk. However, in other examples, block 1720 can involve applying the segmentation network directly on input image $I_t$ to determine a global segmentation mask M. Detailed procedures related to block 1720 are described below in the context of FIG. 19. As an example related to block 1720, FIG. 3 shows image mask 300, including segmentation mask 310. Segmentation mask 310 is a mask representing face 210 from FIG. 2.

At block 1730, the computing device can create at least one warping mesh v having NR×NC vertices for image $I_t$, where each of NR and NC is greater than 0. As an example related to block 1730, FIG. 4 shows warping mesh 400, where NR=33=a number of rows of warping mesh 400, and NC=25=a number of columns of warping mesh 400. In some examples, warping mesh v may be initialized to an optimized mesh of a previous image (e.g., the optimized mesh from timestep t−1).

At block 1740, the computing device can update warping mesh v with costs associated with performing one or more face-related transformations for the $N_t$ faces in image $I_t$ in locations of mesh v corresponding to mask M. For example, the costs associated with performing one or more face-related transformations can be termed face-related costs. The face-related transformation(s) can correct(s) one or more geometric distortions of at least one of the $N_t$ faces. Detailed procedures related to block 1740 are described below in the context of FIG. 21.

At block 1750, the computing device can update mesh v with costs associated with performing one or more edge-related transformations for preserving straightness of edges of the image modified at least by the one or more face-related transformations and with costs for boundaries of warping mesh v. For example, the costs associated with performing one or more edge-related transformations can be termed edge-related costs. Detailed procedures related to block 1750 were previously described in the context of FIG. 10. In some examples, one or more projection transformations can combine both the one or more face-related transformations and the one or more edge-related transformations; in some of these examples, the face-related costs and the edge-related costs can be combined as projection costs (corresponding to the combined projection transformations).

At block 1760, the computing device can determine optimized mesh v' based on a numerical optimization, such as a minimization, of cost terms of vertices of warping mesh v as updated in blocks 1740 and 1750. Detailed procedures related to block 1760 were previously described in the context of FIG. 11.

At block 1770, the computing device can determine inverse mesh z by resampling optimized mesh v'. Detailed procedures related to block 1770 were previously described in the context of FIG. 12.

At block 1780, the computing device can determine output image O by at least: for each pixel P(O) of image O, update P(O) based on a sample of image $I_t$ taken at sampling coordinates determined based on inverse mesh z. Detailed procedures related to block 1780 were previously described in the context of FIG. 13.

As an example related to block 1780, FIG. 6 shows output image 600 that corrects input image 200. In particular, face 610 in output image 600 has been rotated and scaled in comparison to face 210 of input image 200, where face 610 has been rotated and scaled by the face-related transformations discussed above in the context of at least block 1740. Output image 600 also shows that straight lines have been preserved; e.g., straight lines outlining doors, door frames, etc. with respect to wall 640 as represented in output image 600 are also shown as straight lines with respect to wall 240 represented in input image 200.

At block 1790, the computing device can provide output image O; e.g., display part or all of output image O and store part or all of output image O in volatile and/or non-volatile memory. Additionally, the computing device can communicate part or all of output image O to one or more other computing devices, print output image O to paper, etc. Further, the computing device can increment/continue timestep t to timestep t+1 and perhaps repeats method 1700 at timestep t+1.

Figure 18:
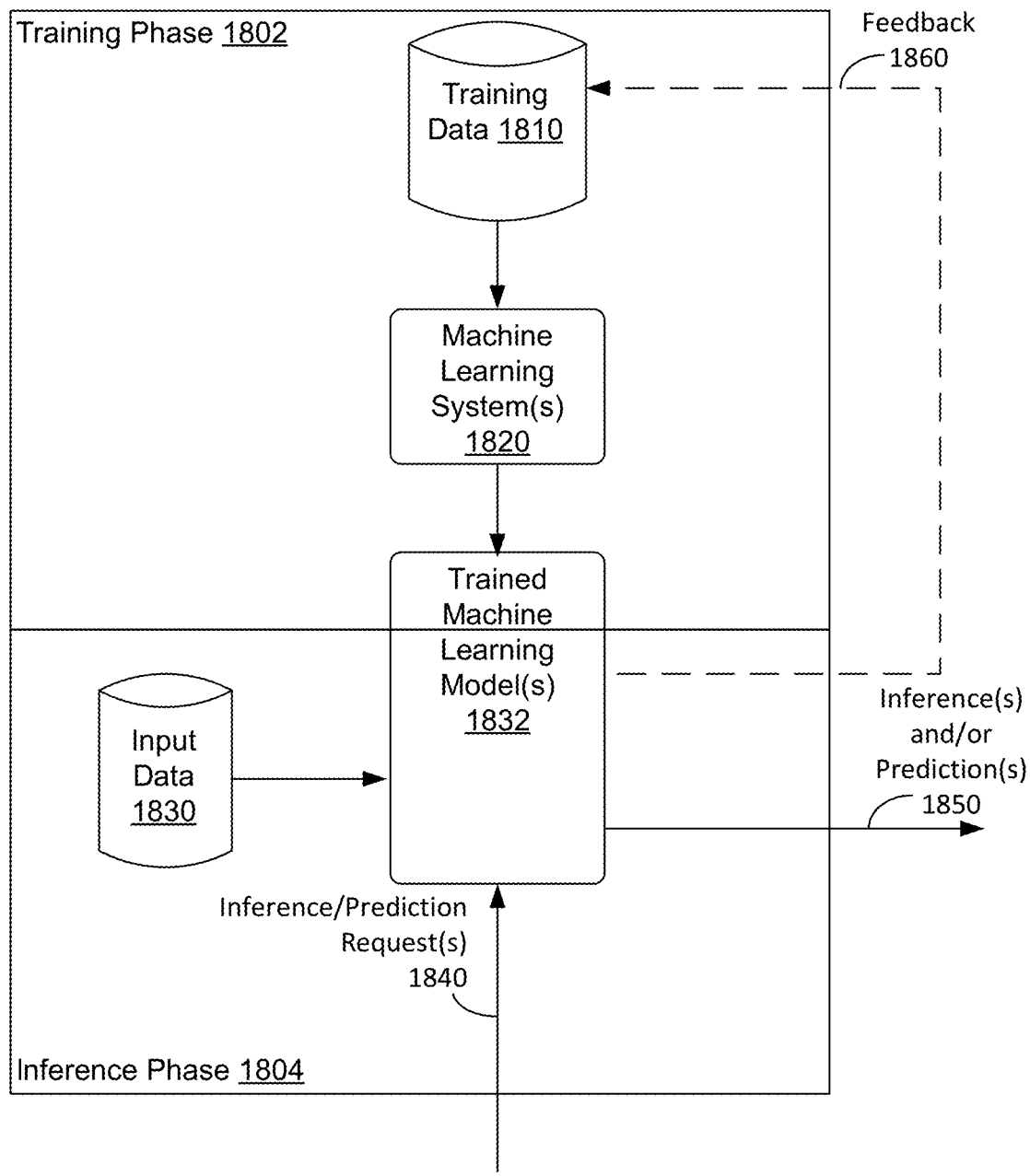
FIG. 18 illustrates phases of a machine learning model, in accordance with an example embodiment.

FIG. 18 shows system 1800 illustrating a training phase 1802 and an inference phase 1804 of trained machine learning model(s) 1832, in accordance with example embodiments. Some machine learning techniques involve training one or more machine learning systems on an input set of training data to recognize patterns in the training data and provide output inferences and/or predictions about (patterns in the) training data. The resulting trained machine learning system can be called a trained machine learning model or machine learning model, for short. For example, FIG. 18 shows training phase 1802 where one or more machine learning systems 1820 are being trained on training data 1810 to become one or more trained machine learning models 1832. Then, during inference phase 1804, trained machine learning model(s) 1832 can receive input data 1830 and one or more inference/prediction requests 1840 (perhaps as part of input data 1830) and responsively provide as an output one or more inferences and/or predictions 1850.

Machine learning system(s) 1820 may include, but are not limited to: an artificial neural network, a Bayesian network, a hidden Markov model, a Markov decision process, a logistic regression function, a support vector machine, a suitable statistical machine learning algorithm, and/or a heuristic machine learning system. During training phase 1802, machine learning system(s) 1820 can be trained by providing at least training data 1810 as training input using training techniques, such as but not limited to, unsupervised, supervised, semi-supervised, reinforcement learning, transfer learning, incremental learning, and/or curriculum learning techniques.

Unsupervised learning involves providing a portion (or all) of training data 1810 to machine learning system(s) 1820. Then, machine learning system(s) 1820 can determine one or more output inferences based on the provided portion (or all) of training data 1810. Supervised learning can involve providing a portion of training data 1810 to machine learning system(s) 1820, with machine learning system(s) 1820 determining one or more output inferences based on the provided portion of training data 1810, and the output inference(s) are either accepted or corrected based on correct results associated with training data 1810. In some examples, supervised learning of machine learning system(s) 1820 can be governed by a set of rules and/or a set of labels for the training input, and the set of rules and/or set of labels may be used to correct inferences of machine learning system(s) 1820.

Semi-supervised learning can involve having correct results for part, but not all, of training data 1810. During semi-supervised learning, supervised learning is used for a portion of training data 1810 having correct results, and unsupervised learning is used for a portion of training data 1810 not having correct results. Reinforcement learning involves machine learning system(s) 1820 receiving a reward signal regarding a prior inference, where the reward signal can be a numerical value. During reinforcement learning, machine learning system(s) 1820 can output an inference and receive a reward signal in response, where machine learning system(s) 1820 are configured to try to maximize the numerical value of the reward signal. In some examples, reinforcement learning also utilizes a value function that provides a numerical value representing an expected total of the numerical values provided by the reward signal over time.

Transfer learning techniques can involve trained machine learning model(s) 1832 being pre-trained on one set of data and additionally trained using training data 1810. More particularly, machine learning system(s) 1820 can be pre-trained on data from one or more computing devices and a resulting trained machine learning model provided to computing device CD1, where CD1 is intended to execute the trained machine learning model during inference phase 1804. Then, during training phase 1802, the pre-trained machine learning model can be additionally trained using training data 1810, where training data 1810 can be derived from kernel and non-kernel data of computing device CD1. This further training of the machine learning system(s) 1820 and/or the pre-trained trained machine learning model using training data 1810 of CD1's data can be performed using either supervised or unsupervised learning. Once machine learning system(s) 1820 and/or the pre-trained machine learning model has been trained on at least training data 1810, training phase 1802 can be completed. The trained resulting machine learning model can be utilized as at least one of trained machine learning model(s) 1832.

Incremental learning techniques can involve providing trained machine learning model(s) 1832 (and perhaps machine learning system(s) 1820) with input data that is used to continuously extend knowledge of trained machine learning model(s) 1832. Curriculum learning techniques. can involve machine learning system(s) 1820 with training data arranged in a particular order, such as providing relatively-easy training examples first and proceeding with progressively more difficult training examples e.g., analogously to a curriculum or course of study at a school. Other techniques for training machine learning system(s) 1820 and/or trained machine learning model(s) 31832 are possible as well.

In some examples, after training phase 1802 has been completed but before inference phase 1804 begins, trained machine learning model(s) 1832 can be provided to a computing device CD1 where trained machine learning model(s) 1832 are not already resident; e.g., after training phase 1802 has been completed, trained machine learning model(s) 1832 can be downloaded to computing device CD1.

For example, a computing device CD2 storing trained machine learning model(s) 1832 can provide trained machine learning model(s) 1832 to computing device CD1 by one or more of: communicating a copy of trained machine learning model(s) 1832 to computing device CD1, making a copy of trained machine learning model(s) 1832 for computing device CD1, providing access to trained machine learning model(s) 1832 computing device CD1, and/or otherwise providing the trained machine learning system to computing device CD1. In some examples, trained machine learning model(s) 1832 can be used by computing device CD1 immediately after being provided by computing device CD2. In some examples, after trained machine learning model(s) 1832 are provided to computing device CD1, trained machine learning model(s) 1832 can be installed and/or otherwise prepared for use before trained machine learning model(s) 1832 can be used by computing device CD1.

During inference phase 1804, trained machine learning model(s) 1832 can receive input data 1830 and generate and output corresponding inference(s) and/or prediction(s) 1850 about input data 1830. As such, input data 1830 can be used as an input to trained machine learning model(s) 1832 for providing corresponding inference(s) and/or prediction(s) 1850 to kernel components and non-kernel components. For example, trained machine learning model(s) 1832 can generate inference(s) and/or prediction(s) 1850 in response to inference/prediction request(s) 1840. In some examples, trained machine learning model(s) 1832 can be executed by a portion of other software. For example, trained machine learning model(s) 1832 can be executed by an inference or prediction daemon to be readily available to provide inferences and/or predictions upon request. Input data 1830 can include data from computing device CD1 executing trained machine learning model(s) 1832 and/or input data from one or more computing devices other than CD1.

In some examples, input data 1830 can include a collection of images provided by one or more sources. The collection of images can include images of an object, such as a human face, where the images of the human face are taken under different lighting conditions, images of multiple human faces, images of human bodies, images resident on computing device CD1, and/or other images. Other types of input data are possible as well.

Inference(s) and/or prediction(s) 1850 can include output images, segmentation masks, numerical values, and/or other output data produced by trained machine learning model(s) 1832 operating on input data 1830 (and training data 1810). In some examples, trained machine learning model(s) 1832 can use output inference(s) and/or prediction(s) 1850 as input feedback 1860. Trained machine learning model(s) 1832 can also rely on past inferences as inputs for generating new inferences.

In some examples, machine learning system(s) 1820 and/or trained machine learning model(s) 1832 can be executed and/or accelerated using one or more computer processors and/or on-device coprocessors. The on-device coprocessor(s) can include, but are not limited to one or more graphic processing units (GPUs), one or more tensor processing units (TPUs), one or more digital signal processors (DSPs), and/or one or more application specific integrated circuits (ASICs). Such on-device coprocessors can speed up training of machine learning system(s) 1820 and/or generation of inference(s and/or prediction(s) 1850 by trained machine learning model(s) 1832. In some examples, trained machine learning model(s) 1832 can be trained, reside and execute to provide inference(s) and/or prediction(s) 1850 on a particular computing device, and/or otherwise can make inferences for the particular computing device.

Figure 19:
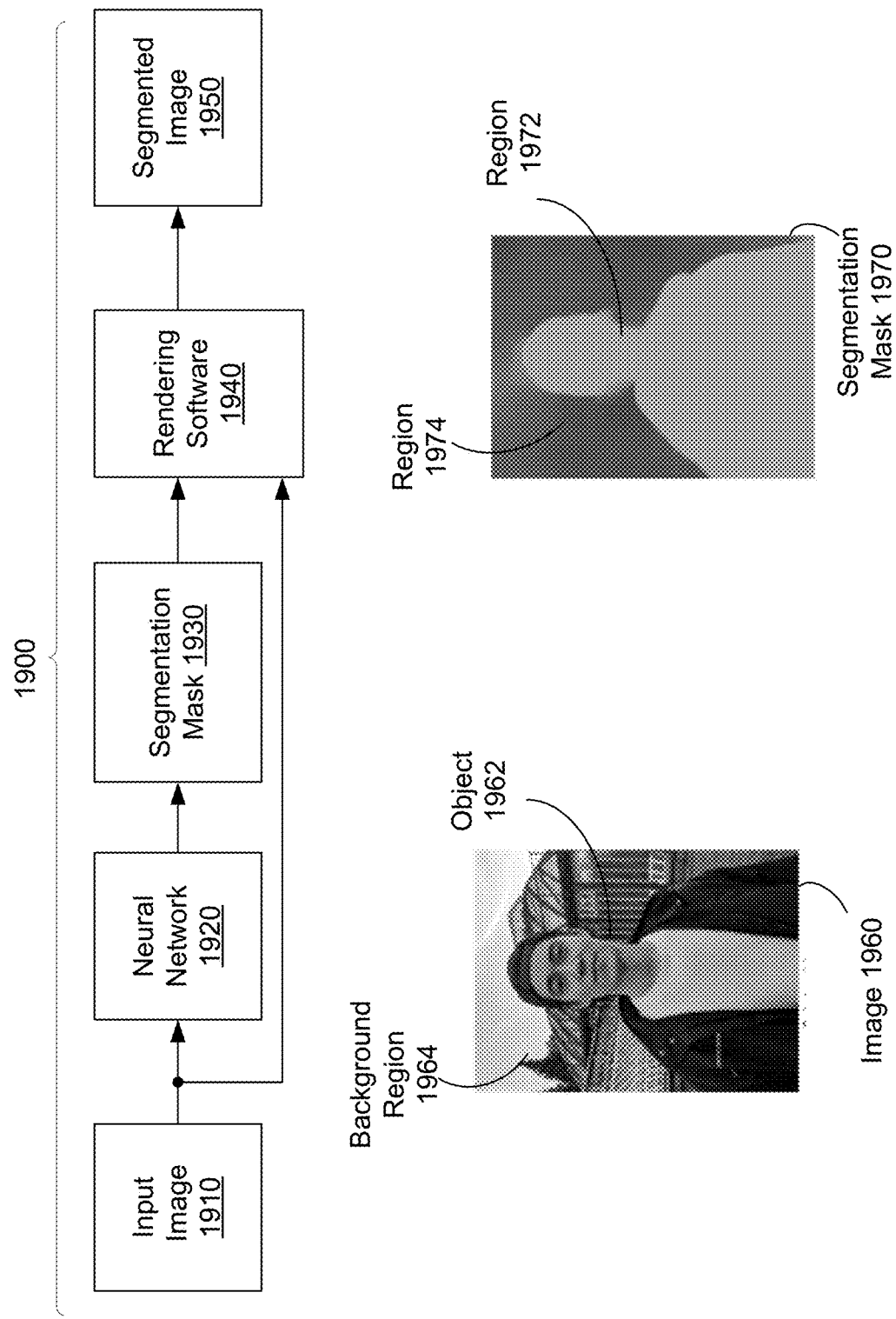
FIG. 19 is a flowchart of a method, in accordance with an example embodiment.

FIG. 19 is a flowchart of method 1900, in accordance with an example embodiment. Method 1900 may represent the procedures of block 1720 of method 1700. For example, the computing device performing method 1700 can perform some or all of the procedures of method 1900 while performing the procedures of block 1720 of method 1700.

During method 1900, the computing device receives input image 1910, which may correspond to image $I_t$ from method 1700. Input image 1910 can be provided to neural network 1920, which can responsively generate segmentation mask 1930 for input image 1910. Neural network 1920 can be an example of machine learning system(s) 1820 of system 1800 discussed above in the context of FIG. 18. After training, the trained version of neural network 1920 can be an example of trained machine learning model(s) 1832. In this specific example, input data 1830 of system 1800 can include input image 1910, inference/prediction request(s) 1840 of system 1800 can include a request for a segmentation mask for input image 1910, and inferences and/or prediction(s) 1850 can include segmentation mask 1930 for input image 1910. Segmentation mask 1930 can be stored, communicated, and/or otherwise provided. In some embodiments, method 1900 may continue with segmentation mask 1930 and input image 1910 being provided to rendering software 1940, which uses segmentation mask 1930 to selectively mask sections of input image 1910; e.g., by masking background objects and not masking foreground objects.

In some examples, neural network 1920 can receive training images, including images with segmentation data, to produce estimated segmentations masks, such as segmentation mask 1930. Neural network 1920 can be trained on a relatively-large dataset (e.g., 50,000 or more) of training images. The dataset of training images can include images containing a single human face/body, or multiple human faces/body. Moreover, the dataset of training images can include images containing human faces/bodies in a variety foreground poses and background settings. The dataset of training images can be annotated (e.g., labelled, classified, and/or assigned a ground truth value) with pixel-accurate locations of foreground elements associated with human faces/human bodies; e.g., hair, glasses, neck, skin, lips, etc.

Background elements not associated with human faces/ human bodies can also be annotated.

In some examples, training images are adjusted to achieve frame-to-frame temporal continuity. More specifically, a given training image may be combined with the segmentation mask from a preceding time step to adjust for temporal discontinuities that may occur between successive images (e.g., people suddenly appearing in the field of view of the camera between timesteps). For example, if neural network 1920 is currently training on training image X, the segmentation mask for training image X-1 may be included as part of training image X, where training image X is captured subsequent to training image X-1. Further, segmentation masks for previous time steps may be annotated in several ways to account for different types of scenarios. In some cases, the segmentation mask for a previous training image may be empty, which trains neural network 1920 to work correctly for a first frame in an image sequence and for new objects that appear in an environment (e.g., the case of someone suddenly appearing in the camera's frame). In other cases, the segmentation mask from a previous training image may undergo an affine transformation, which trains neural network 1920 to use the previous frame mask to achieve a smooth transition between successive frames. In further cases, the segmentation mask for a previous training image may undergo a major transformation, which trains neural network 1920 to understand inadequate masks (e.g., segmentation masks that causes high prediction errors) and discard them. Other annotated/labels for segmentations masks are also possible.

In some examples, the training images used to train neural network 1920 can contain images not containing any human faces/bodies. In such a scenario, the training images can be classified based on object types; e.g., one or more object types for plants, one or more object types for buildings, one or more object types for landscapes, one or more object types for animals, one or more object types for persons, including one or more object types for faces of persons. In some of these examples, the training images can include images with foreground objects having one or more specified object types; e.g., images of people, images of faces of people, images of buildings, etc.

FIG. 19 also shows image 1960, which depicts a person as foreground object 1962 in front of background region 1964. In this example, image 1960 is provided to neural network 1920 as an input; e.g., an instance of input image 1910. Neural network 1920 responsively generates segmentation mask 1970 for image 1960. In the illustration of segmentation mask 1970 in FIG. 19, the lighter-colored pixels in region 1972 correspond to portions of image 1960 that represent a human face/human body and darker-colored pixels in region 1974 correspond to portions of image 1960 that do not represent a human face/human body.

Figure 20A:
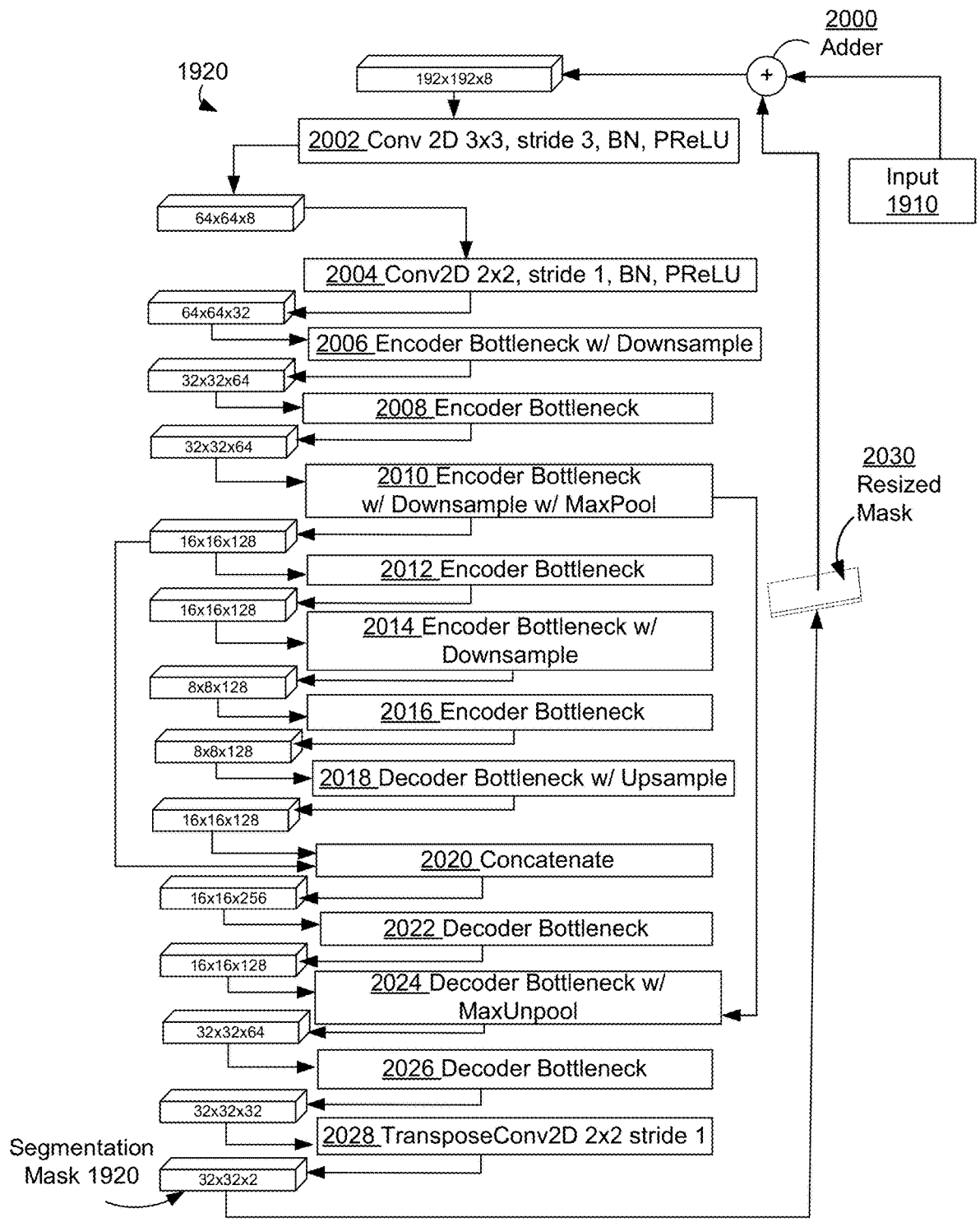
FIG. 20A illustrates a neural network, in accordance with an example embodiment.

FIG. 20A illustrates neural network 1920 of method 1900, in accordance with example embodiments. Neural network 1920 can be a convolutional encoder-decoder neural network. In some examples, part or all of neural network 1920 can be implemented using specialized hardware and/or software designed for neural networks; e.g., specialized neural network circuitry, software libraries with software supporting neural networks.

As indicated above, neural network 1920 can receive input image 1910 and responsively generate segmentation mask 1930 for input image 1910 as an output. In the description of neural network 1920, the dimensions of volumes are presented in the form H×W×D, where H is a positive integer associated with a number of horizontal pixels (or rows of pixels) of the volume, W is a positive integer associated with a number of vertical pixels (or columns of pixels) of the volume, and D is a positive integer associated with the number of channels of the volume (e.g., depth).

Generally speaking, the architecture illustrated in FIG. 20A consists of a contracting/encoding path (e.g., the layers of neural network 1920 from layer(s) 2002 to layer(s) 2016) and an expansive/decoding path (e.g., the layers of neural network 1920 from layer(s) 2018 to layer(s) 2028).

During operations, neural network 1920 may receive input image 1910 at adder 2000. The input image may be a 192×192×3 volume. As mentioned above, adder 2000 may operate to add input image 1910 with the output of neural network 1920 from the previous timestep. In particular, segmentation mask 1930 from the previous timestep may be transformed into resized mask 2030. The dimensions of resized mask 2030 may match those of input image 1910. Adder 2000 can append resized mask 2030 as another channel for input image 1910 (e.g., converts input image 1910 from a 192×192×3 volume into a 192×192×4 volume, with the resized mask 2030 being the additional channel). The output of adder 2000 can be passed to layer(s) 2002.

Layer(s) 2002 perform a 2-D convolution with a 3×3 kernel with stride 3, followed by a batch normalization operation, followed by a parametric rectified linear unit (PReLU) operation on the output from adder 2000 to generate a 64×64×8 volume as output. Layer(s) 2002 pass the 664×64×8 volume as input to layer(s) 2004. Notably, other types of normalization or activation functions may also be used.

Layer(s) 2004 perform a 2-D convolution with a 2×2 kernel with stride 1, followed by a batch normalization operation, followed by a PReLU operation on the input from layer(s) 2002 to generate a 64×64×32 volume as output. Layer(s) 2004 pass the 64×64×32 volume as input to layer(s) 2006, which perform encoder bottleneck with down-sampling operations on the output from layer(s) 2004.

Figure 20B:
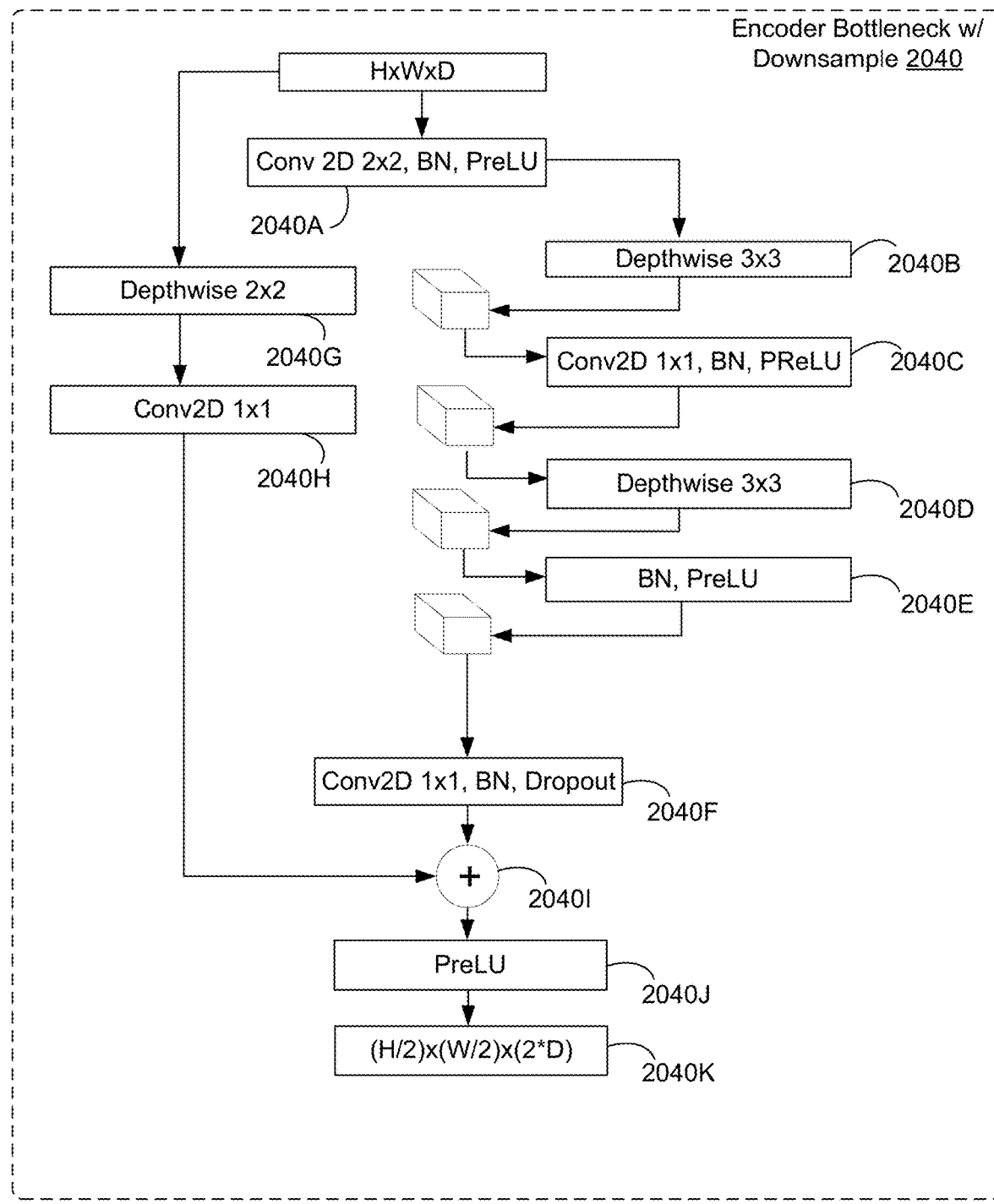
FIG. 20B illustrates an encoder bottleneck with downsample function of the neural network of FIG. 20A, in accordance with an example embodiment.

FIG. 20B illustrates encoder bottleneck with down-sampling function 2040 that neural network 1920 can use to perform encoder bottleneck with down-sampling operations, in accordance with example embodiments. For example, encoder bottleneck with down-sampling function 2040 can be used to implement some or all of layer(s) 2006 and layer(s) 2014.

Encoder bottleneck with down-sampling function 2040 can be invoked with an input H×W×D volume. Upon invocation, encoder bottleneck with down-sampling function 2040 provides the H×W×D volume to layer(s) 2040A. Layer(s) 2040A perform a 2-D convolution on the H×W×D volume with a 2×2 kernel, followed by a batch normalization and PReLU operation and pass the output to layer(s) 2040B. Layer(s) 2040B perform a 2-D depthwise convolution with a 3×3 kernel and pass the output to layer(s) 2040C. Layer(s) 2040C perform a 2-D convolution with a 1×1 kernel, followed by a batch normalization and PReLU operation and pass the output to layer(s) 2040D. Layer(s) 2040D perform a 2-D depthwise convolution with a 3×3 kernel and pass the output to layer(s) 2040E. Layer(s) 2040E perform a batch normalization and PReLU operation and pass the output to layer(s) 2040F. Layer(s) 2040F perform a 2-D convolution with a 1×1 kernel, followed by a batch normalization and a dropout operation and pass the output to layer(s) 2040I.

Simultaneously and/or additionally, encoder bottleneck with down-sampling function 2040 provides the H×W×D volume to layer(s) 2040G. Layer(s) 2040G perform a 2-D depthwise convolution with a 2×2 kernel and pass the output to layer(s) 2040H. Layer(s) 2040H perform a 2-D convolution with a 1×1 kernel and pass the output to layer(s) 2040I.

Layer(s) 2040I perform an addition on the output from layer(s) 2040F and layer(s) 2040H and provide the output to layer(s) 2040J. Layer(s) 2040J perform a PReLU operation to generate an output volume of (H/2)×(W/2)×*(2*D).

Returning to FIG. 20A, the output of layer(s) 2006 may be a 32×32×64 volume. Layer(s) 2006 pass the 32×32×64 volume as input to layer(s) 2008, which perform encoder bottleneck operations on the output from layer(s) 2006.

Figure 20C:
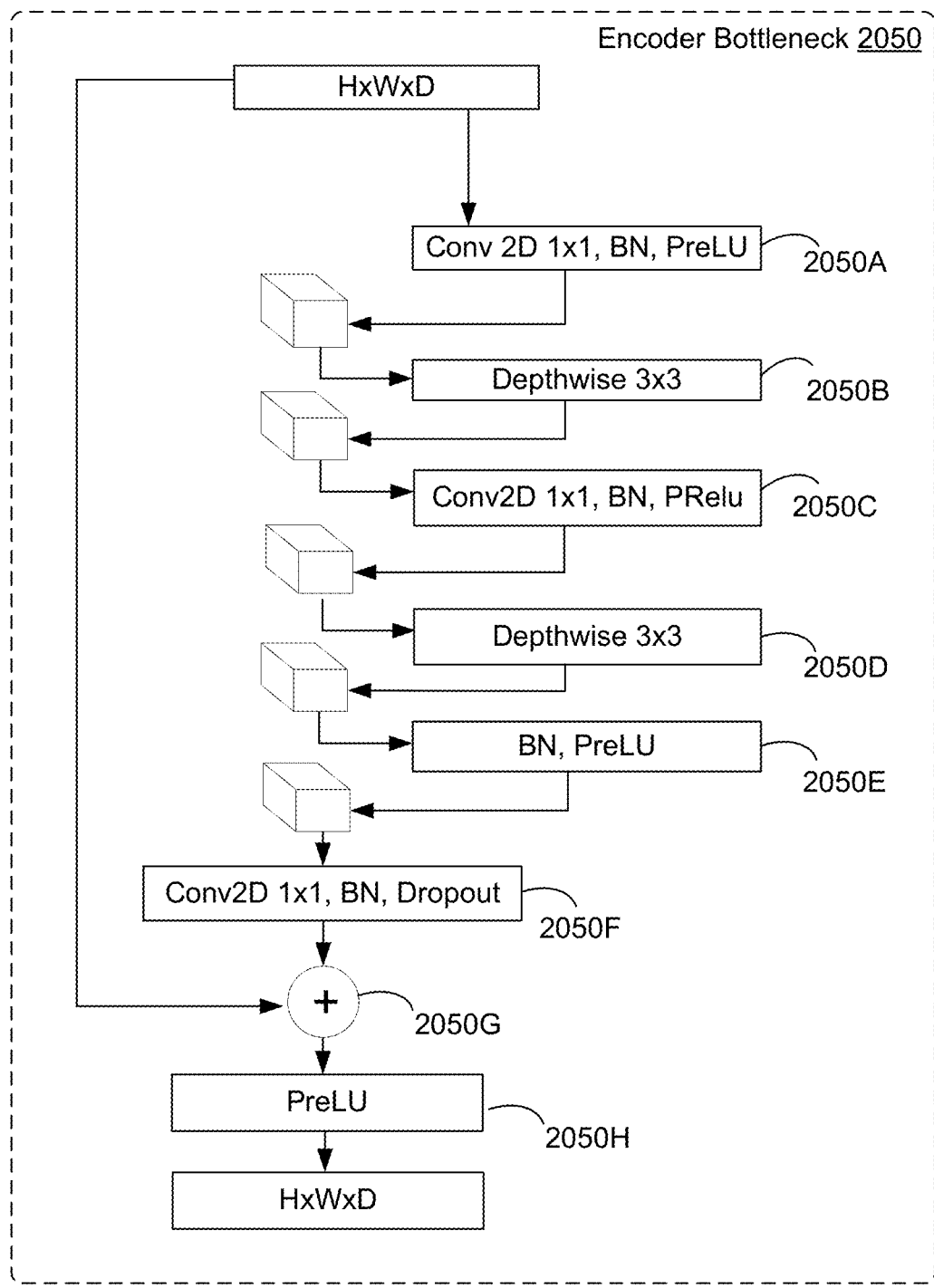
FIG. 20C illustrates an encoder bottleneck function of the neural network of FIG. 20A, in accordance with an example embodiment.

FIG. 20C illustrates encoder bottleneck function 2050 that neural network 1920 can use to perform encoder bottleneck operations, in accordance with example embodiments. For example, encoder bottleneck function 2050 can be used to implement some or all of layer(s) 2008 and layer(s) 2012.

Encoder bottleneck function 2050 can be invoked with an input H×W×D volume. Upon invocation, encoder bottleneck function 2050 provides the H×W×D volume to layer(s) 2050A. Layer(s) 2050A perform a 2-D convolution on the H×W×D volume with a 1×1 kernel, followed by a batch normalization and PReLU operation and pass the output to layer(s) 2050B. Layer(s) 2050B perform a 2-D depthwise convolution with a 3×3 kernel and pass the output to layer(s) 2050C. Layer(s) 2050C perform a 2-D convolution with a 1×1 kernel, followed by a batch normalization and PReLU operation and pass the output to layer(s) 2050D. Layer(s) 2050D perform a 2-D depthwise convolution with a 3×3 kernel and pass the output to layer(s) 2050E. Layer(s) 2050E perform a batch normalization and PReLU operation and pass the output to layer(s) 2050F. Layer(s) 2050F perform a 2-D convolution with a 1×1 kernel, followed by a batch normalization and a dropout operation and pass the output to layer(s) 2050G.

Simultaneously and/or additionally, encoder bottleneck function 2050 provides the original H×W×D volume to layer(s) 2050G.

Layer(s) 2050G perform an addition on the output from layer(s) 2050F and the original H×W×D volume and provide the output to layer(s) 2050H. Layer(s) 2050H perform a PReLU to generate an output volume of H×W×D.

Returning to FIG. 20A, the output of layer(s) 2008 may be a 32×32×64 volume. Layer(s) 2008 pass the 32×32×64 volume as input to layer(s) 2010, which perform encoder bottleneck with downsample and maxpool operations on the output from layer(s) 2008.

Figure 20D:
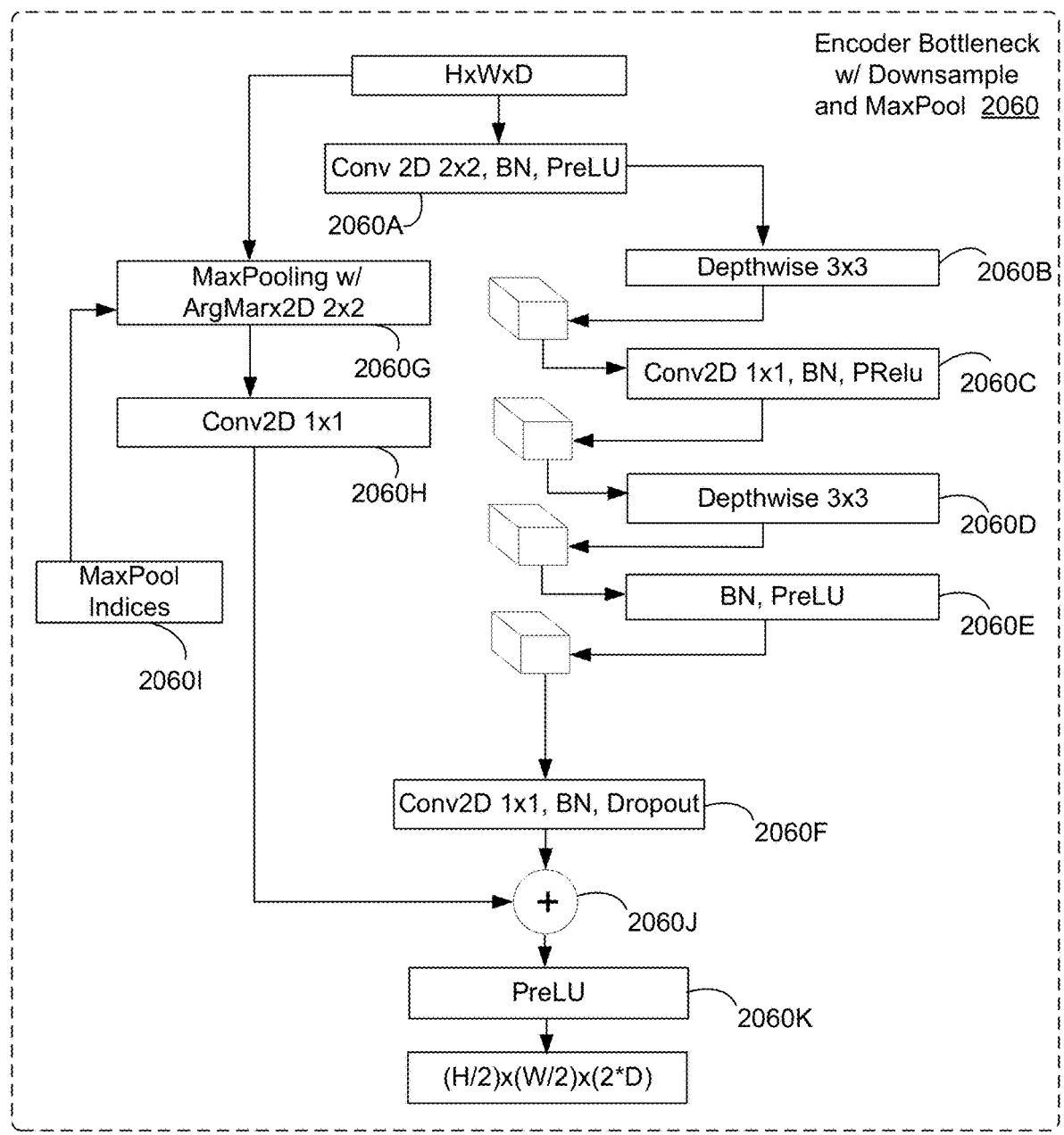
FIG. 20D illustrates an encoder bottleneck with downsample and max-pool function of the neural network of FIG. 20A, in accordance with an example embodiment.
Figure 20E:
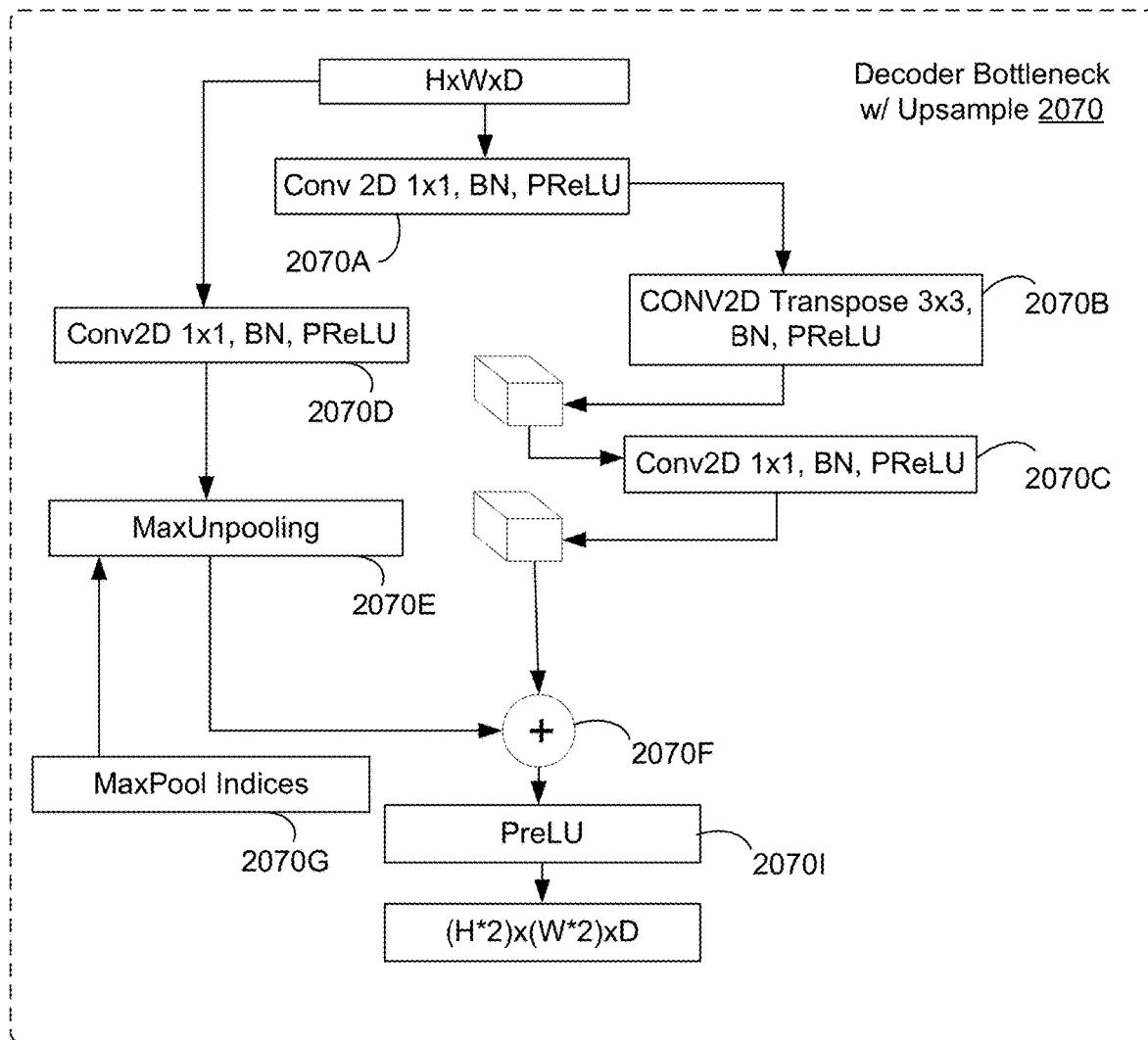
FIG. 20E illustrates a decoder bottleneck with up-sample function of the neural network of FIG. 20A, in accordance with an example embodiment.

FIG. 20D illustrates an encoder bottleneck with down-sampling and maxpool function 2060 that neural network 1920 can use to perform encoder bottleneck with down-sample and maxpool operations, in accordance with example embodiments. For example, encoder bottleneck with down-sampling and maxpool function 2060 can be used to implement some or all of layer(s) 2010.

Encoder bottleneck with down-sampling and maxpool function 2060 can be invoked with an input H×W×D volume. Upon invocation, encoder bottleneck with down-sampling and maxpool function 2060 provides the H×W×D volume to layer(s) 2060A. Layer(s) 2060A perform a 2-D convolution on the H×W×D volume with a 2×2 kernel, followed by a batch normalization and PReLU operation and pass the output to layer(s) 2060B. Layer(s) 2060B perform a 2-D depthwise convolution with a 3×3 kernel and pass the output to layer(s) 2060C. Layer(s) 2060C perform a 2-D convolution with a 1×1 kernel, followed by a batch normalization and PReLU operation and pass the output to layer(s) 2060D. Layer(s) 200D perform a 2-D depthwise convolution with a 3×3 kernel and pass the output to layer(s) 2060E.

Layer(s) 2060E perform a batch normalization and PReLU operation and pass the output to layer(s) 2060F. Layer(s) 2060F perform a 2-D convolution with a 1×1 kernel, followed by a batch normalization and a dropout operation and pass the output to layer(s) 2060J.

Simultaneously and/or additionally, encoder bottleneck with down-sampling and maxpool function 2060 provides the original H×W×D volume to layer(s) 2060G. Using maxpool indices 2060I, layer(s) 2060G perform an argmax maxpooling operation with a 2×2 kernel and pass the output to layer(s) 2060H. Layer(s) 2060H perform a 2-D convolution with a 1×1 kernel and pass the output to layer(s) 2060J.

Layer(s) 2060J perform an addition on the output from layer(s) 2060F and layer(s) 2060H and provide the output to layer(s) 2060K. Layer(s) 2060K perform a PReLU to generate an output volume of (H/2)×(W/2)×(2*D).

Returning to FIG. 20A, the output of layer(s) 2010 may be a 16×16×128 volume. Layer(s) 2010 pass the 16×16×128 volume as input to layer(s) 2012, which perform encoder bottleneck operations on the output from layer(s) 2010, as previously described with respect to FIG. 20C. The output of layer(s) 2012 may be a 16×16×128 volume. Layer(s) 2010 may also pass the 16×16×128 volume as input to layers(s) 2020 and may pass max-pooling indices to layer(s) 2024 (e.g., a skip connection).

Layer(s) 2012 pass the 16×16×128 volume as input to layer(s) 2014, which perform encoder bottleneck with down-sampling operations on the output from layer(s) 2012, as previously described with respect to FIG. 20B. The output of layer(s) 2014 may be an 8×8×128 volume.

Layer(s) 2014 pass the 8×8×128 volume as input to layer(s) 2016, which perform encoder bottleneck operations on the output from layer(s) 2014, as previously described with respect to FIG. 20C. The output of layer(s) 2016 may be an 8×8×128 volume.

Layer(s) 2016 pass the 8×8×128 volume as input to layer(s) 2018, which perform decoder bottleneck with up-sampling operations on the output from layer(s) 2016.

FIG. 20D illustrates decoder bottleneck with up-sampling function 2070 that neural network 1920 can use to perform decoder bottleneck with up-sampling operations, in accordance with example embodiments. For example, decoder bottleneck with up-sampling function 2070 can be used to implement some or all of layer(s) 2018. Decoder bottleneck with up-sampling function 2070 can be invoked with an input H×W×D volume. Upon invocation, decoder bottleneck with up-sampling function 2070 provides the H×W×D volume to layer(s) 2070A. Layer(s) 2070A perform a 2-D convolution on the H×W×D volume with a 1×1 kernel, followed by a batch normalization and PReLU operation and pass the output to layer(s) 2070B. Layer(s) 2070B perform a 2-D transpose convolution with a 3×3 kernel, followed by a batch normalization and PReLU operation and pass the output to layer(s) 2070C. Layer(s) 2070C perform a 2-D convolution with a 1×1 kernel, followed by a batch normalization and PReLU operation and pass the output to layer(s) 2070F.

Simultaneously and/or additionally, decoder bottleneck with up-sampling function 2070 provides the original H×W×D volume to layer(s) 2070D. Layer(s) 2070D perform a 2-D convolution on the H×W×D volume with a 1×1 kernel, followed by a batch normalization and PReLU operation and pass the output to layer(s) 2070E. Using maxpool indices 2070G (for example passed from layer(s) 2010), layer(s) 2070G perform an 2-D max-unpooling operation and pass the output to layer(s) 2070F.

Layer(s) 20701 perform an addition on the output from layer(s) 2070G and layer(s) 2070C and provide the output to layer(s) 20701. Layer(s) 20701 perform a PreLU to generate an output volume of (H*2)×(W*2)×D.

Returning to FIG. 20A, the output of layer(s) 2018 may be a 16×16×128 volume. Layer(s) 2018 pass the 16×16×128 volume as input to layer(s) 2020, which may concatenate the output from layer(s) 2018 with the output from layer(s) 2010. The output of layer(s) 2020 may be a 16×16×256 volume. Layer(s) 2020 pass the 16×16×256 volume as input to layer(s) 2022, which perform decoder bottleneck operations on the output from layer(s) 2022.

Figure 20F:
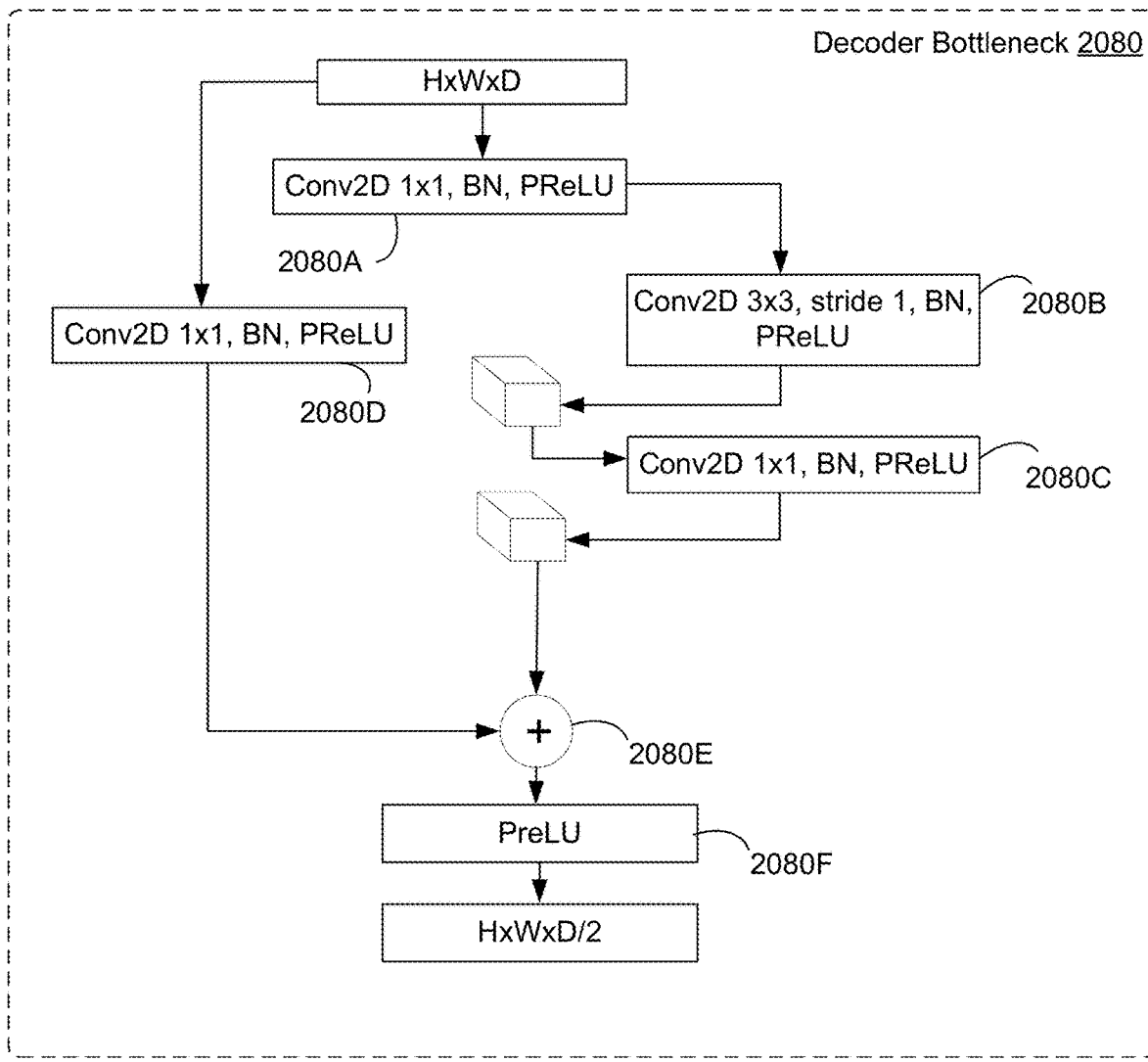
FIG. 20F illustrates a decoder bottleneck function of the neural network of FIG. 20A, in accordance with an example embodiment.

FIG. 20F illustrates decoder bottleneck function 2080 that neural network 1920 can use to perform decoder bottleneck operations, in accordance with example embodiments. For example, decoder bottleneck function 2080 can be used to implement some or all of layer(s) 2022 and layer(s) 2026. Decoder bottleneck function 2080 can be invoked with an input H×W×D volume. Upon invocation, decoder bottleneck function 2080 provides the H×W×D volume to layer(s) 2080A. Layer(s) 2080A perform a 2-D convolution on the H×W×D volume with a 1×1 kernel, followed by a batch normalization and PReLU operation and pass the output to layer(s) 2080B. Layer(s) 2080B perform a 2-D convolution with a 3×3 kernel with stride 1, followed by a batch normalization and PReLU operation and pass the output to layer(s) 2080C. Layer(s) 2080C perform a 2-D convolution with a 1×1 kernel, followed by a batch normalization and PReLU operation and pass the output to layer(s) 2080E.

Simultaneously and/or additionally, decoder bottleneck function 2080 provides the input H×W×D volume to layer(s) 2080D. Layer(s) 2080D perform a 2-D convolution with a 1×1 kernel, followed by a batch normalization and PReLU operation and pass the output to layer(s) 2080E.

Layer(s) 2080E perform an addition on the output from layer(s) 2080C and layer(s) 2080D and provide the output to layer(s) 2080F. Layer(s) 2080F perform a PreLU to generate an output volume of H×W×(D/2).

Returning to FIG. 20A, the output of layer(s) 2022 may be a 16×16×128 volume. Layer(s) 2022 pass the 16×16×128 volume as input to layer(s) 2024, which may perform decoder bottleneck with max-unpool operations on the output from layer(s) 2022.

Figure 20G:
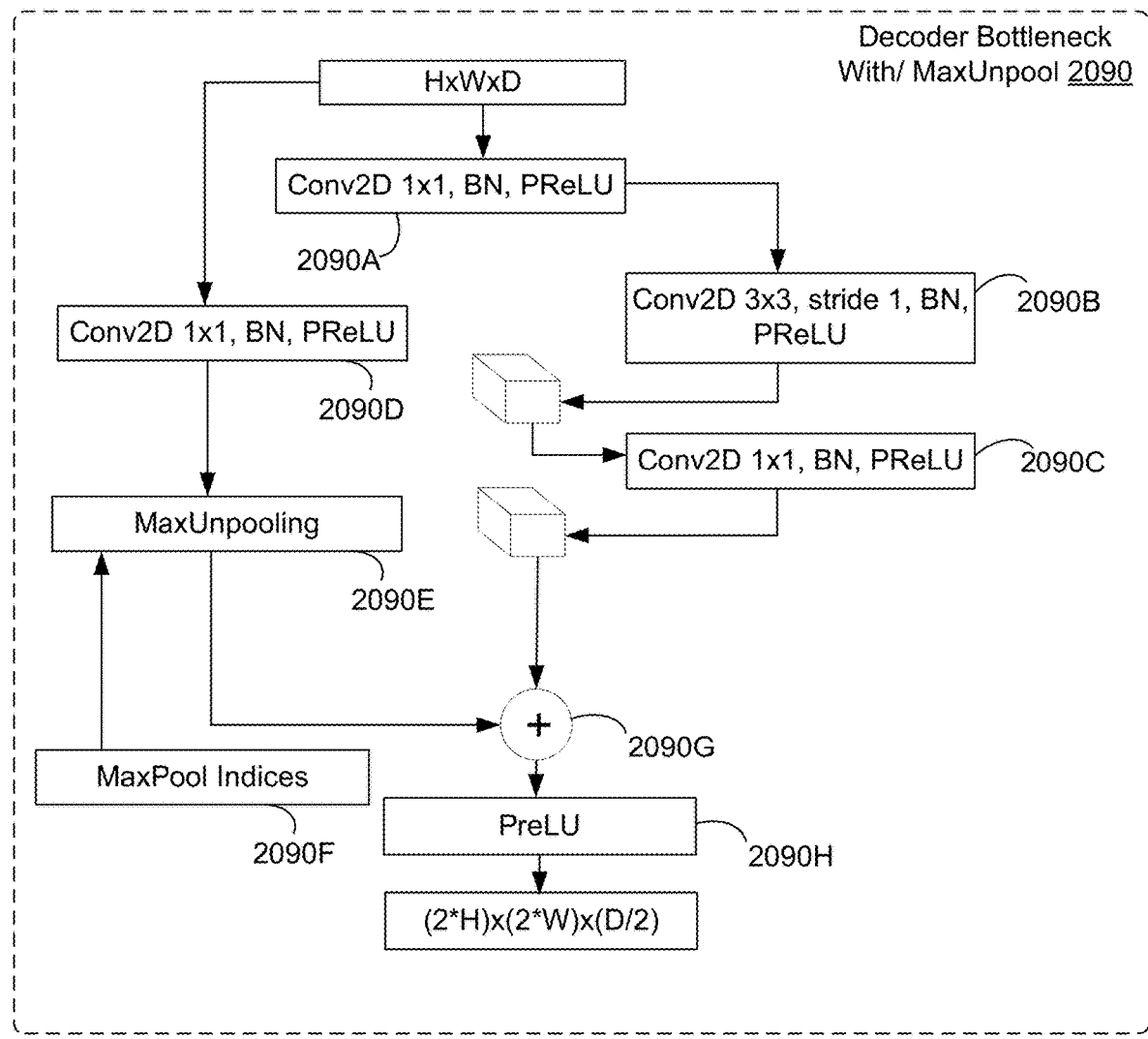
FIG. 20G illustrates a decoder bottleneck with max-unpool function of the neural network of FIG. 20A, in accordance with an example embodiment.

FIG. 20G illustrates decoder bottleneck with max-unpool function 2090 that neural network 1920 can use to perform decoder bottleneck with max-unpool operations, in accordance with example embodiments. For example, decoder bottleneck function 2080 can be used to implement some or all of layer(s) 2024.

Decoder bottleneck with max-unpool function 2090 can be invoked with an input H×W×D volume. Upon invocation, decoder bottleneck with max-unpool function 2090 provides the H×W×D volume to layer(s) 2090A. Layer(s) 2090A perform a 2-D convolution on the H×W×D volume with a 1×1 kernel, followed by a batch normalization and PReLU operation and pass the output to layer(s) 2090B. Layer(s) 2090B perform a 2-D convolution with a 3×3 kernel, stride 1, followed by a batch normalization and PReLU operation and pass the output to layer(s) 2090C. Layer(s) 2090C perform a 2-D convolution with a 1×1 kernel, followed by a batch normalization and PReLU operation and pass the output to layer(s) 2090G.

Simultaneously and/or additionally, decoder bottleneck with max-unpool function 2090 provides the input H×W×D volume to layer(s) 2090D. Layer(s) 2090D perform a 2-D convolution with a 1×1 kernel, followed by a batch normalization and PReLU operation and pass the output to layer(s) 2090E. Using maxpool indices 2090F received from layer(s) 2010, layer(s) 2090E perform a maxpooling operation with a 2×2 kernel and pass the output to layer(s) 2090G.

Layer(s) 2080G perform an addition on the output from layer(s) 2090E and layer(s) 2090C and provide the output to layer(s) 2090H. Layer(s) 2090H perform a PreLU to generate an output volume of (2*H)×(2*W)×(D/2).

Returning to FIG. 20A, the output of layer(s) 2024 may be a 32×32×64 volume. Layer(s) 2024 pass the 32×32×64 volume as input to layer(s) 2026, which perform decoder bottleneck operations on the output from layer(s) 2024, as previously described with respect to FIG. 20F. The output of layer(s) 2026 may be a 32×32×32 volume. Layer(s) 2026 pass the 32×32×32 volume as input to layer(s) 2028, which perform a 2-D convolutional transpose operation with a 2×2 kernel with stride 1 on the output from layer(s) 2026.

The output of layer(s) 2028 may be a 32×32×2 volume and may correspond to segmentation mask 1920 from FIG. 19.

It should be noted that the layers illustrated in neural network 1920 are a convenient conceptual representation of an architecture, but are not intended to be limiting with respect to example embodiments or techniques described herein. In further examples, neural network 1920 can have more or less layers with different functions.

Figure 21:
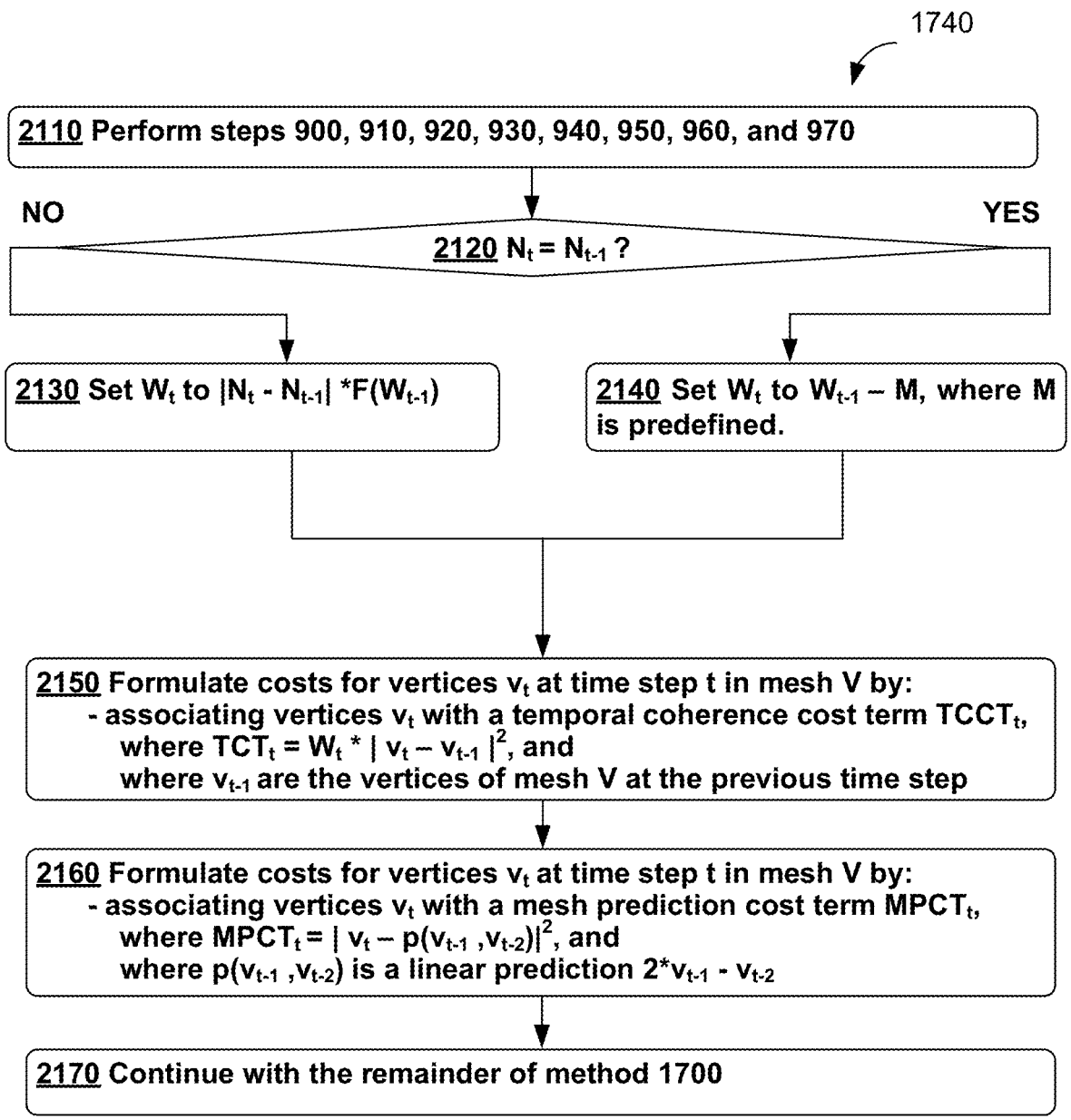
FIG. 21 is a flowchart of a method, in accordance with an example embodiment.

FIG. 21 is a flowchart of a method for the procedures of block 1740 of method 1700, in accordance with an example embodiment. For example, the computing device performing method 1700 can perform some or all of the procedures of blocks 2110, 2120, 2130, 2140, 2150, 2160, and 2170 while performing the procedures of block 1740 of method 1700.

At block 2110, the computing device can perform, on image $I_t$, the procedures of blocks 900, 910, 920, 930, 940, 950, 960, and 970 as previously described with respect to FIG. 9.

At block 2120, the computing device can determine whether $N_t$ (e.g., the number of faces represented in image $I_t$) equals $N_{t-1}$ (e.g., the number of faces represented in image $I_{t-1}$). Both $N_t$ and $N_{t-1}$ can be calculated using the procedures of block 1720 of method 1700 and the computing device may store the results of $N_t$ and $N_{t-1}$ for later use. If the computing device determines that $N_t$ equals $N_{t-1}$, then the computing device can proceed to block 2140. Otherwise, the computing device can determine that $N_t$ does not equal $N_{t-1}$ and can proceed to block 2130.

At block 2130, the computing device can set the value of weight term $W_t$ to be $N_t - N_{t-1} * W_{t-1}$, where $W_{t-1}$ is the weight term of the previous image $I_{t-1}$. The idea here is that if $N_t$ does not equal $N_{t-1}$ (e.g., the number of faces has changed from one image to the next image), then $W_t$ should increase from the previous timestep t−1 so as to keep mesh v at timestep t similar to mesh v at timestep t−1.

At block 2140, the computing device can set the value of weight term $W_t$ to be $W_{t-1} - M$, where $W_{t-1}$ is the weight term of the previous image $I_{t-1}$ mid where M is a predefined number (e.g., M=0.01, 1, 2, 10, 1000). The reasoning here is that if $N_t$ equals $N_{t-1}$ (e.g., the number of faces has not changed from one image to the next image), then $W_t$ should decrease from the previous timestep t−1 so as to allow mesh v at timestep t to deviate from mesh v at timestep t−1.

At block 2150, the computing device can associate each vertex in mesh v with temporal coherence term $TCCT_t$. In examples, the temporal coherence term is computed as $TCCT_t = W_t * |v_t - v_{t-1}|^2$, where $W_t$ is the weighting term set in blocks 2130 or block 2140, $v_t$ are the vertices of mesh v at timestep t, and $v_{t-1}$ are the vertices of mesh v at timestep t−1

(e.g., the mesh from the previous timestep). The idea behind the temporal coherence term is to balance deviations of mesh v between timestep t and timestep t−1. For example, if $W_t$ is set to a high value, then large deviations in mesh v between timestep t and timestep t−1 (e.g., $v_t-v_{t-1}$) carry a high cost and may not transpire during the optimization process. But if $W_t$ is set to a low value, then large deviations in mesh v do not carry a high cost and may transpire during the optimization process.

At block 2160, the computing device can associate each vertex in mesh v with mesh prediction cost term $MPCT_t$. In examples, the mesh prediction cost term is computed as $MPCT_t = v_t - p(v_{t-1}, v_{t-2})|^2$, where $v_t$ are the vertices of mesh v at timestep t, $v_{t-1}$ are the vertices of mesh v at timestep t−1, $v_{t-2}$ are the vertices of mesh v at timestep t−2, and where $p(v_{t-1}, v_{t-2})$ is a linear prediction $2*v_{t-1}-v_{t-2}$. The idea behind the mesh prediction cost term is to ensure mesh v undergoes sufficient change between timestep t and timestep t−1. In particular, the linear prediction $2*v_{t-1}-v_{t-2}$ places a high cost on small deviations in mesh v between timestep t and timestep t−1. For example, if $v_t=v_{t-1}$, then $MPCT_t$ carries a high cost. But if $v_t=2*v_{t-1}$, then $MPCT_t$ does not carry a high cost.

At block 2170, the computing device can proceed with the remainder of method 1700; i.e., complete the procedures of block 1740 of method 1700 and continue method 1700 by beginning performance of the procedures of block 1750 of method 1700.

Example Data Network

Figure 22:
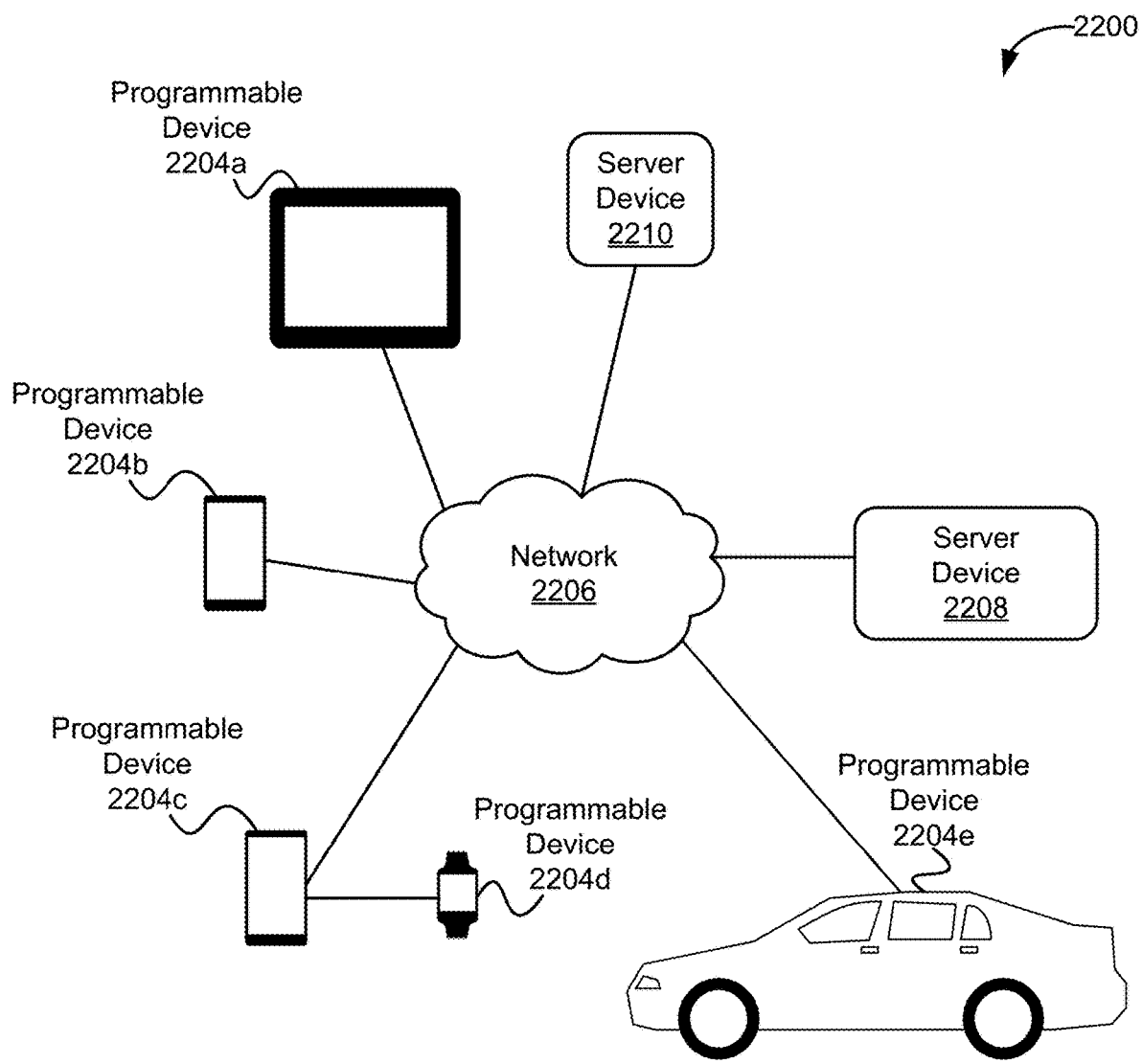
FIG. 22 depicts a distributed computing architecture, in accordance with an example embodiment.

FIG. 22 depicts a distributed computing architecture 2200, in accordance with an example embodiment. Distributed computing architecture 2200 can include server devices 2208, 2210 configured to communicate, via network 2206, with programmable devices 2204a, 2204b, 2204c, 2204d, 2204e. Network 2206 may correspond to a LAN, a wide area network (WAN), a corporate intranet, the public Internet, or any other type of network configured to provide a communications path between networked computing devices. Network 2206 may also correspond to a combination of one or more LANs, WANs, corporate intranets, and/or the public Internet.

Although FIG. 22 only shows five programmable devices, distributed application architectures may serve tens, hundreds, or thousands of programmable devices. Moreover, programmable devices 2204a, 2204b, 2204c, 2204d, 2204e, (or any additional programmable devices) may be any sort of computing device, such as an ordinary laptop computer, desktop computer, wearable computing device, mobile computing device, head-mountable device, network terminal, wireless communication device (e.g., a smart phone or cell phone), and so on. In some embodiments, such as indicated with programmable devices 2204a, 2204b, 2204c, programmable devices can be directly connected to network 2206. In other embodiments, such as indicated with programmable device 2204d, programmable devices can be indirectly connected to network 2206 via an associated computing device, such as programmable device 2204c. In this example, programmable device 2204c can act as an associated computing device to pass electronic communications between programmable device 2204d and network 2206. In yet other embodiments, such as shown in programmable device 2204e, a computing device can be part of and/or inside a vehicle; e.g., a car, a truck, a bus, a boat or ship, an airplane, etc. In still other embodiments not shown in FIG. 22, a programmable device can be both directly and indirectly connected to network 2206.

Server devices 2208, 2210 can be configured to perform one or more services, as requested by programmable devices 2204a-2204e. For example, server device 2208 and/or 2210 can provide content to programmable devices 2204a-2204e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 2208 and/or 2210 can provide programmable devices 2204a-2204e with access to software for database, search, computation, graphical, audio, video, World Wide Web/Internet utilization, and/or other functions. Many other examples of server devices are possible as well.

Computing Device Architecture

Figure 23:
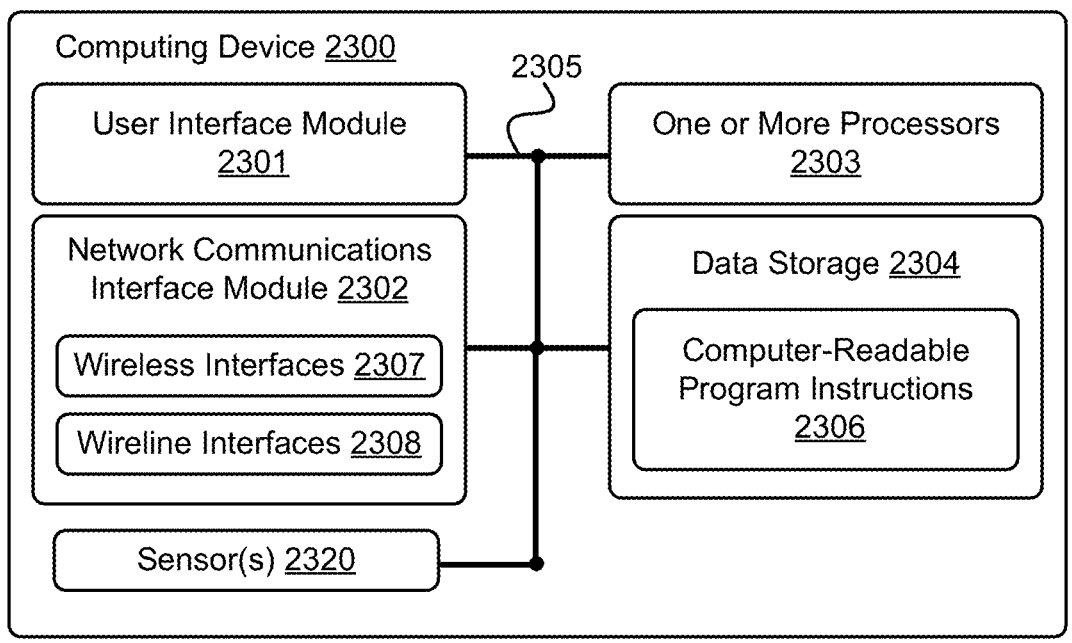
FIG. 23 is a functional block diagram of an example computing device, in accordance with an example embodiment.

FIG. 23 is a functional block diagram of an example computing device 2300, in accordance with an example embodiment. In particular, computing device 2300 shown in FIG. 23 can be configured to perform at least one function of input image 200, image mask 300, warping mesh 400, optimized mesh 500, output image 600, computing device 1610, machine learning system 1800, neural network 1920, distributed computing architecture 2200, programmable devices 2204a, 2204b, 2204c, 2204d, 2204e, network 2206, and/or server devices 2208, 2210, and/or at least one function related to method 100, scenario 1400, scenario 1500, scenario 1600, method 1700, method 1900, and/or method 2400.

Computing device 2300 may include user interface module 2301, network communications interface module 2302, one or more processors 2303, data storage 2304, and one or more sensors 2320, all of which may be linked together via a system bus, network, or other connection mechanism 2305.

User interface module 2301 can be operable to send data to and/or receive data from external user input/output devices. For example, user interface module 2301 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 2301 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 2301 can also be configured to generate audible outputs, such as a speaker, speaker jack, audio output port, audio output device, earphones, and/or other similar devices. User interface module 2301 can further be configured with one or more haptic devices that can generate haptic outputs, such as vibrations and/or other outputs detectable by touch and/or physical contact with computing device 2300. In some embodiments, user interface module 2301 can be used to provide a graphical user interface for utilizing computing device 2300.

Network communications interface module 2302 can include one or more wireless interfaces 2307 and/or one or more wireline interfaces 2308 that are configurable to communicate via a network. Wireless interfaces 2307 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 2308 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 2302 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 2303 can include one or more general purpose processors, and/or one or more special purpose processors (e.g., digital signal processors, graphics processing units, application specific integrated circuits, etc.). One or more processors 2303 can be configured to execute computer-readable program instructions 2306 that are contained in data storage 2304 and/or other instructions as described herein.

Data storage 2304 can include one or more computer-readable storage media that can be read and/or accessed by at least one of one or more processors 2303. The one or more computer-readable storage media can include volatile and/or non-volatile storage components, such as optical, magnetic, organic or other memory or disc storage, which can be integrated in whole or in part with at least one of one or more processors 2303. In some embodiments, data storage 2304 can be implemented using a single physical device (e.g., one optical, magnetic, organic or other memory or disc storage unit), while in other embodiments, data storage 2304 can be implemented using two or more physical devices.

Data storage 2304 can include computer-readable program instructions 2306 and perhaps additional data. In some embodiments, data storage 2304 can additionally include storage required to perform at least part of the herein-described methods, scenarios, and techniques and/or at least part of the functionality of the herein-described devices and networks.

In some embodiments, computing device 2300 can include one or more sensors 2320. Sensors 2320 can be configured to measure conditions in an environment of computing device 2300 and provide data about that environment. For example, sensors 1820 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (ii) sensors to measure locations and/or movements of computing device 2300, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 2300, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 2300, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 2320 are possible as well.

Example Methods of Operation

Figure 24:
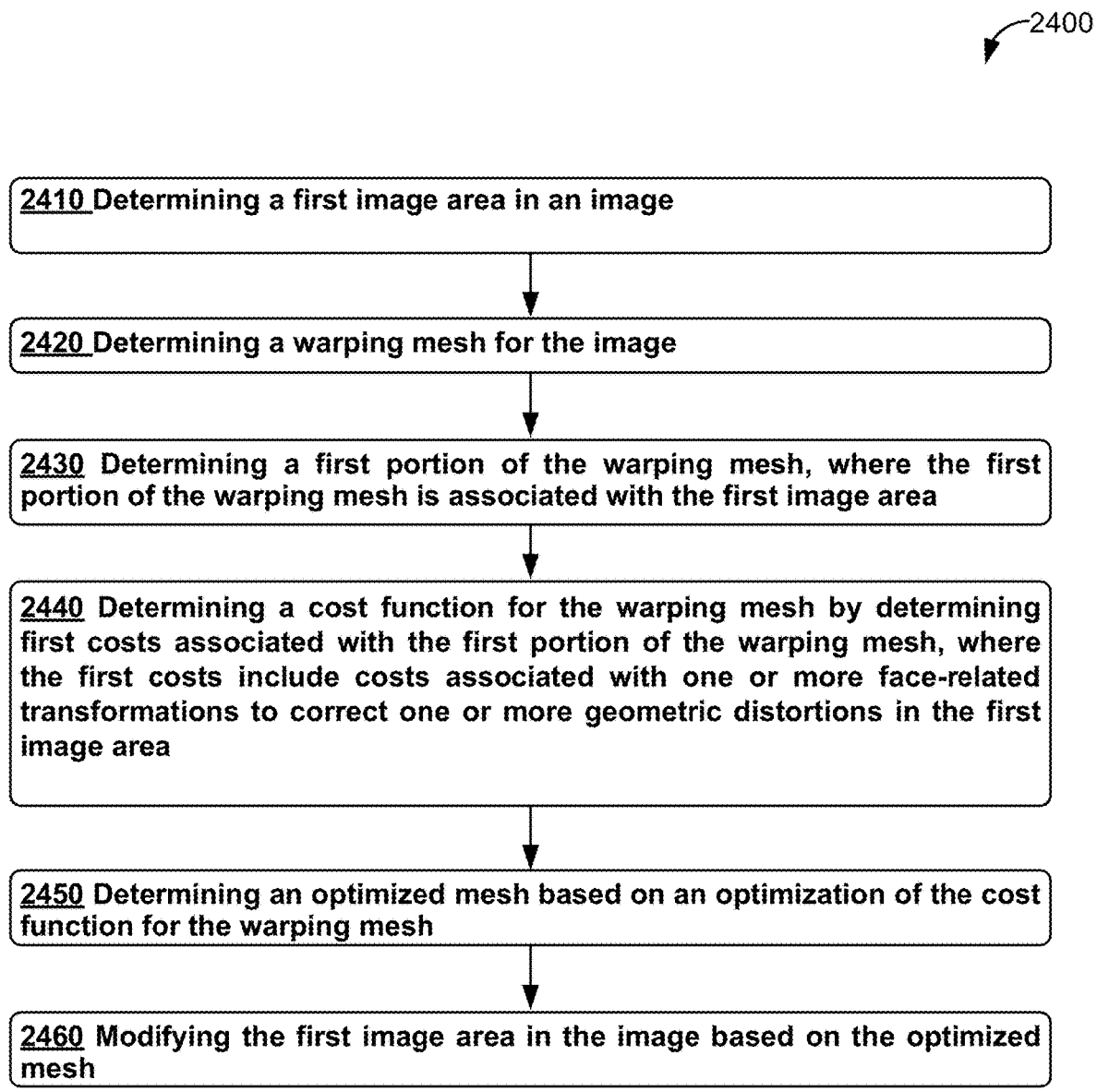
FIG. 24 is a flowchart of a method, in accordance with an example embodiment.

FIG. 24 is a flowchart of a method 2400, in accordance with an example embodiment. Method 2400 can be a computer-implemented method. For example, method 2400 can be executed by a computing device, such as computing device 2300.

FIG. 24 shows that method 2400 can begin at block 2410. At block 2410, the computing device can determine a first image area in an image, such as discussed above at least in the context of FIGS. 1, 2, 7, 8, 14, 15, 16, 17, 19, and 20A.

At block 2420, the computing device can determine a warping mesh for the image, such as discussed above at least in the context of FIGS. 1, 4, 9, 17, and 21.

At block 2430, the computing device can determine a first portion of the warping mesh, where the first portion of the warping mesh is associated with the first image area, such as discussed above at least in the context of FIGS. 1, 5, 9, 17, and 21.

At block 2440, the computing device can determine a cost function for the warping mesh by determining first costs associated with the first portion of the warping mesh, where the first costs include costs associated with one or more face-related transformations to correct one or more geometric distortions in the first image area, such as discussed above at least in the context of FIGS. 1, 9, 10, 17, and 21.

At block 2450, the computing device can determine an optimized mesh based on an optimization of the cost function for the warping mesh, such as discussed above at least in the context of FIGS. 1, 5, 10, 11, 17, and 21.

At block 2460, the computing device can modify the first image area in the image based on the optimized mesh, such as discussed above at least in the context of FIGS. 1, 6, 12, 13, 14, 15, 16, 17 and 21.

In some examples, the optimization of the cost function can includes a minimization of the cost function; then, determining the optimized mesh based on the optimization of the cost function can include: determining the optimized mesh by performing the minimization of the cost function applied to the warping mesh, determining a left-maximum cost as a maximum of costs of vertices of a left border of the optimized mesh; determining a right-minimum cost of a minimum of costs of vertices of a right border of the optimized mesh; determining a top-maximum cost as a maximum of costs of vertices of a top border of the optimized mesh; determining a bottom-minimum cost of a minimum of costs of vertices of a bottom border of the optimized mesh; and modifying the optimized mesh based on the left-maximum cost, the right-minimum cost, the top-maximum cost, and the bottom-minimum cost, such as discussed above at least in the context of FIGS. 10, 11, 17 and 21.

In some of these examples, modifying the optimized mesh based on the left-maximum cost, the right-minimum cost, the top-maximum cost, and the bottom-minimum cost can include: determining a width scale for the image based on a width of the image and a difference between the right-minimum cost and the left-maximum cost; determining a height scale for the image based on a height of the image and a difference between the bottom-minimum cost and the top-maximum cost; and performing a mathematical scaling of the optimized mesh based on the width scale and the height scale, such as discussed above at least in the context of FIGS. 11, 17, and 21.

In some examples, the image can include a plurality of pixels; then, modifying the first image area of the image based on the optimized mesh can include: determining a sampled mesh by sampling the optimized mesh, the sampled mesh including a plurality of sampled vertices; for a particular pixel of the plurality of pixels, modifying the particular pixel by at least: determining one or more neighboring vertices of the plurality of sampled vertices that neighbor the particular pixel; determining coordinates for a resampled pixel of the plurality of pixels based on the one or more neighboring vertices; determining pixel values for the resampled pixel by sampling one or more pixels of the plurality of pixels based on the coordinates for the resampled pixel; and modifying the particular pixel based on the pixel values for the resampled pixel such as discussed above at least in the context of FIGS. 1, 13, 17, and 21.

In other examples, the one or more face-related transformations of at least the first image area can include a rotation of the first image area, a translation of the first image area, and/or a scaling of the first image area; then, determining the warping mesh for the image can include: determining a third mesh for the image, the third mesh including a third plurality of vertices; and determining the warping mesh based on the third mesh by at least: determining one or more sides of the third mesh, and for each side of the one or more sides of the third mesh: adding a pre-determined number of additional vertices to the side of the third mesh, after adding the pre-determined number of additional vertices to the side of the third mesh, determining a boundary of the third mesh that is associated with the side of the third mesh, the boundary associated with boundary vertices of the third mesh, and determining a dimension of the boundary vertices of the third mesh to be perpendicular to a boundary of the image, such as discussed above at least in the context of FIGS. 1, 9, 10, 17, and 21.

In some examples, determining the first costs associated with the first portion of the warping mesh can include: mapping the first image area to a first space using a first transformation; mapping the first image area to a second space using a second transformation; determining a first aspect ratio for the first image area, the first aspect ratio based on a ratio of an area of the first space to an area of the second space; and determining the first costs associated with the first portion of the warping mesh based on the first aspect ratio, such as discussed above at least in the context of FIGS. 9, 17, and 21. In some of these examples, the first transformation can include a perspective transformation, and where the second transformation can include a stereographic transformation, such as discussed above at least in the context of FIG. 9. In other of these examples, the warping mesh can include a plurality of vertices; then, determining the first costs associated with the first portion of the warping mesh can include: initializing a first cost of a first vertex in the first portion of the warping mesh to a value associated with an interpolation of a first-transformation value associated with the first transformation at the first vertex and a second transformation value associated with the first transformation at the first vertex, such as discussed above at least in the context of FIGS. 11, 17, and 21.

In some examples, the warping mesh includes a plurality of vertices, and determining the cost function includes determining second costs associated with the warping mesh, where the second costs includes costs of one or more edge-related transformations for preserving straightness of edges of the image modified at least by the one or more face-related transformations; and where determining the second costs associated with the warping mesh can include: assigning a per-vertex edge cost for each vertex of the warping mesh associated with an edge of the image; and assigning a boundary cost for each vertex of the warping mesh associated with a boundary of the warping mesh, such as discussed above at least in the context of FIGS. 10, 17, and 21.

In some examples, assigning the per-vertex edge cost for each vertex of the warping mesh associated with an edge of the image can include: determining a first edge-regularization term for a first edge of the image, where the first edge of the image is associated with at least a first edge vertex of the warping mesh; determining a first edge-bending term for the first edge of the image; and determining the per-vertex edge cost for the first edge vertex based on the first edge-regularization term and the first edge-bending term, such as discussed above at least in the context of FIGS. 10, 17, and 21.

In some examples, assigning the boundary cost for each vertex of the warping mesh associated with a boundary of the warping mesh can include: determining a boundary-cost value for a first boundary vertex of the warping mesh, the first boundary vertex associated with a first boundary of the warping mesh, where the boundary-cost value is based on a distance between the first boundary vertex and a border of the warping mesh, such as discussed above at least in the context of FIGS. 10, 17, and 21.

In some examples, method 1900 can further include: determining a second image area in the image, the second image area differing from the first image area; and determining a second portion of the warping mesh, where the second portion of the warping mesh is associated with the second image area, where determining the cost function for the warping mesh further includes determining additional first costs associated with the second portion of the warping mesh, where the additional first costs comprise costs associated with one or more face-related transformations to correct one or more geometric distortions in the second image area, such as discussed above at least in the context of FIGS. 1, 7, 14, 15, 16, 17, and 21.

In some examples, determining the first image area in the image can include applying a neural network on the image to determine a segmentation mask, where the neural network is trained to determine a segmentation mask for a given input image, and providing the segmentation mask as the first image area, such as discussed above at least in the context of FIGS. 17, 18, 19, and 20A.

In some examples, the image is part of a set of successive images, and applying the neural network on the image includes adding, to the image, a prior segmentation mask from a previous image in the set of successive images, such as discussed above at least in the context of FIGS. 17, 18, 19, and 20A.

In some examples, adding the prior segmentation mask includes resizing an output of the neural network for the previous image to match one or more dimensions of the image, such as discussed above at least in the context of FIGS. 17, 18, 19, and 20A.

In some examples, the image is part of a set of successive images and the warping mesh is initialized to an optimized mesh of a previous image in the set of successive images, such as discussed above at least in the context of FIGS. 17, 18, 19, and 20A.

In some examples, modifying the first image area of the image based on the optimized mesh can include: calculating a sampling of the optimized mesh; and modifying at least the first image area of the image based on the sampling of the optimized mesh, such as discussed above at least in the context of FIGS. 1, 12, 13, 17, and 21.

In some examples, the image is part of a set of successive images, the warping mesh includes a plurality of vertices, and where determining the first costs associated with the first portion of the warping mesh includes determining a coherence cost by comparing vertices of the warping mesh to the vertices of a prior warping mesh from a previous image in the set of successive images and determining the coherence cost based on the comparison, such as discussed above at least in the context of FIGS. 17, and 21.

In some examples, determining the coherence cost further includes mathematically scaling the comparison by applying a weighting parameter, where the weighting parameter is associated with a number of regions of interests in the image, such as discussed above at least in the context of FIGS. 17, and 21.

In some examples, the weighting parameter is increased if the number of regions of interests has changed from the previous image, and the weighting parameter is decreased if the number of regions of interests has not changed from the previous image, such as discussed above at least in the context of FIGS. 17, and 21.

In some examples, the image is part of a set of successive images, the warping mesh comprises a plurality of vertices, and where determining the first costs associated with the first portion of the warping mesh comprises determining a prediction cost by: comparing vertices of the warping mesh to the vertices of a prior warping mesh from a previous image in the set of successive images, comparing vertices of the warping mesh to the vertices of a second prior warping mesh from a second previous image in the set of successive images, and determining the prediction cost based on the comparisons, such as discussed above at least in the context of FIGS. 17, and 21.

In some examples, determining the first image area can include obtaining the image from a camera, such as discussed above at least in the context of FIGS. 14, 15, and 16.

In some examples, a computing device can be provided, where the computing device includes: one or more processors; and one or more computer readable media. The one or more computer readable media can have computer-readable instructions stored thereon that, when executed by the one or more processors, cause the computing device to carry out functions that include method 2400.

In other examples, a computing device can be provided, where the computing device includes means for carrying out method 2400.

In even other examples, an article of manufacture can be provided. The article of manufacture can include one or more computer readable media having computer-readable instructions stored thereon that, when executed by one or more processors of a computing device, cause the computing device to carry out functions that include method 1900. In some of these examples, the one or more computer readable media can include one or more non-transitory computer readable media.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

Variations of the above referenced approach will be apparent to the skilled person. For example, while the above description provides particular disclosure of corrections to distortion of faces in an image, the approach may also be applied to other regions or objects of interest. As such, where the adjective "facial" is referred to in the above disclosure (such as in the phrases "facial regions" or "facial transformation"), the skilled person will appreciate that alternative approaches may be adopted in which such an adjective is not required. Similarly, references to "face-related costs", "face-related transformations" or other "face-related" features may be more generally considered as "object-related" or "region-related" in alternative implementations.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
    determining a warping mesh for an image area in an image, wherein the image is part of a set of successive image frames;
    determining, for the warping mesh, one or more first transformations to correct one or more geometric distortions in the image area;
    determining, for the warping mesh, one or more second transformations to preserve one or more boundaries of objects outside the image area;
    smoothing inter-frame warping by determining an optimized mesh for a segmentation mask corresponding to the image area, wherein the optimized mesh is based on cost terms for the warping mesh associated with the one or more first transformations and the one or more second transformations; and
    modifying the image area in the image based on the determined optimized mesh.

2. The computer-implemented method of claim 1, wherein the one or more first transformations comprises a conformal projection of the image area.

3. The computer-implemented method of claim 1, wherein the one or more second transformations comprises a perspective projection of a portion of the image outside the image area.

4. The computer-implemented method of claim 1, wherein the determining of the one or more second transformations to preserve the one or more boundaries of objects outside the image area comprises determining the one or more second transformations to preserve straightness of edges represented outside the image area.

5. The computer-implemented method of claim 1, further comprising:
    determining the image area in the image by applying a neural network on the image to determine a segmentation mask, the neural network having been trained to determine segmentation masks for given input images; and
    providing the segmentation mask as the image area.

6. The computer-implemented method of claim 5, further comprising:
    receiving, via a computing device, the set of successive image frames, and wherein the applying of the neural network occurs in substantial real-time; and
    providing, in substantial real-time and via a camera preview feature of the computing device, the modified image.

7. The computer-implemented method of claim 5, wherein the neural network comprises a convolutional encoder-decoder neural network.

8. The computer-implemented method of claim 5, wherein applying the neural network on the image comprises adding, to the image, a prior segmentation mask from a previous image in the set of successive image frames.

9. The computer-implemented method of claim 8, wherein adding the prior segmentation mask comprises resizing an output of the neural network for the previous image to match one or more dimensions of the image.

10. The computer-implemented method of claim 1, further comprising:
    determining a second image area in the image, wherein the second image area is different from the image area; and
    determining a second warping mesh for the second image area;
    determining, for the second warping mesh, one or more additional first transformations to correct one or more geometric distortions in the second image area.

11. The computer-implemented method of claim 1, wherein the determining of the one or more first transformations and the one or more second transformations further comprises:
    determining one or more energy terms associated with the warping mesh, wherein the one or more energy terms comprise energy terms associated with the one or more first transformations and the one or more second transformations;
    determining an energy function for the warping mesh based on the one or more energy terms;
    determining an optimized mesh based on an optimization of the energy function for the warping mesh; and
    wherein the modifying of the image area is based on the optimized mesh.

12. The computer-implemented method of claim 1, wherein the determining of the one or more first transformations and the one or more second transformations further comprises:
    determining one or more cost terms associated with the warping mesh, wherein the one or more cost terms comprise cost terms associated with the one or more first transformations and the one or more second transformations;
    determining a cost function for the warping mesh based on the one or more cost terms; determining an optimized mesh based on an optimization of the cost function for the warping mesh; and
    wherein the modifying of the image area is based on the optimized mesh.

13. The computer-implemented method of claim 12, wherein the determining of the costs associated with the warping mesh comprises:
    mapping the image area to a first space using a perspective transformation;
    mapping the image area to a second space using a stereographic transformation;

determining an aspect ratio for the image area, the aspect ratio based on a ratio of a first area of the first space to a second area of the second space; and determining the one or more cost terms associated with the warping mesh based on the aspect ratio.

14. The computer-implemented method of claim 12, wherein the warping mesh comprises a plurality of vertices, wherein the determining of the cost function comprises determining second costs associated with the warping mesh, wherein the second costs comprise costs of one or more edge-related transformations for preserving straightness of edges of the image modified at least by the one or more first transformations; and wherein the determining of the second costs associated with the warping mesh comprises:

assigning a per-vertex edge cost for each vertex of the warping mesh associated with an edge of the image; and assigning a per-vertex boundary cost for each vertex of the warping mesh associated with a boundary of the warping mesh.

15. The computer-implemented method of claim 14, wherein the assigning of the per-vertex edge cost for each vertex of the warping mesh comprises:

determining a first edge-regularization term for a first edge of the image, wherein the first edge of the image is associated with at least a first edge vertex of the warping mesh;

determining a first edge-bending term for the first edge of the image; and determining the per-vertex edge cost for the first edge vertex based on the first edge-regularization term and the first edge-bending term.

16. The computer-implemented method of claim 14, wherein the assigning of the per-vertex boundary cost for each vertex of the warping mesh comprises:

determining a boundary-cost value for a first boundary vertex of the warping mesh, the first boundary vertex associated with a first boundary of the warping mesh, wherein the boundary-cost value is based on a distance between the first boundary vertex and a border of the warping mesh.

17. The computer-implemented method of claim 1, wherein the modifying of the image area comprises:

determining the optimized mesh based on the one or more first transformations and the one or more second transformations;

calculating a sampling of the optimized mesh; and modifying at least the image area based on the sampling of the optimized mesh.

18. The computer-implemented method of claim 1, wherein the warping mesh is initialized to an optimized mesh of a previous image in the set of successive images.

19. A computing device, comprising:

one or more processors; and one or more computer readable media having computer-readable instructions stored thereon that, when executed by the one or more processors, cause the computing device to carry out functions that comprise:

determining a warping mesh for an image area in an image, wherein the image is part of a set of successive image frames;

determining, for the warping mesh, one or more first transformations to correct one or more geometric distortions in the image area;

determining, for the warping mesh, one or more second transformations to preserve one or more boundaries of objects outside the image area;

smoothing inter-frame warping by determining an optimized mesh for a segmentation mask corresponding to the image area, wherein the optimized mesh is based on cost terms for the warping mesh associated with the one or more first transformations and the one or more second transformations; and modifying the image area in the image based on the determined optimized mesh.

20. An article of manufacture comprising one or more non-transitory computer readable media having computer-readable instructions stored thereon that, when executed by one or more processors of a computing device, cause the computing device to carry out functions comprising:

determining a warping mesh for an image area in an image, wherein the image is part of a set of successive image frames;

determining, for the warping mesh, one or more first transformations to correct one or more geometric distortions in the image area;

determining, for the warping mesh, one or more second transformations to preserve one or more boundaries of objects outside the image area;

smoothing inter-frame warping by determining an optimized mesh for a segmentation mask corresponding to the image area, wherein the optimized mesh is based on cost terms for the warping mesh associated with the one or more first transformations and the one or more second transformations; and modifying the image area in the image based on the determined optimized mesh.

* * * * *